United States Patent
Fremlin et al.

(10) Patent No.: US 11,568,342 B1
(45) Date of Patent: Jan. 31, 2023

(54) GENERATING AND COMMUNICATING DEVICE BALANCE GRAPHICAL REPRESENTATIONS FOR A DYNAMIC TRANSPORTATION SYSTEM

(71) Applicant: Lyft, Inc., San Francisco, CA (US)

(72) Inventors: John Torres Fremlin, New York, NY (US); Yunshu Liu, Redmond, WA (US)

(73) Assignee: Lyft, Inc., San Francisco, CA (US)

( * ) Notice: Subject to any disclaimer, the term of this patent is extended or adjusted under 35 U.S.C. 154(b) by 0 days.

(21) Appl. No.: 16/543,368

(22) Filed: Aug. 16, 2019

(51) Int. Cl.
  *G06Q 10/06* (2012.01)
  *G06Q 50/30* (2012.01)
  *G06Q 10/04* (2012.01)
  *G06Q 10/02* (2012.01)

(52) U.S. Cl.
  CPC ....... *G06Q 10/06315* (2013.01); *G06Q 10/02* (2013.01); *G06Q 10/04* (2013.01); *G06Q 50/30* (2013.01)

(58) Field of Classification Search
  CPC .......... G06Q 50/30; G06Q 10/063116; G06Q 10/063114; G06Q 10/06311; G06Q 10/067; G06Q 10/06315; G06Q 10/06; G06Q 30/0202; G06Q 30/0205; G06Q 10/02
  See application file for complete search history.

(56) References Cited

U.S. PATENT DOCUMENTS

| | | | | |
|---|---|---|---|---|
| 6,577,304 B1* | 6/2003 | Yablonski | ............. | G06Q 10/06 345/419 |
| 6,947,905 B1* | 9/2005 | Starr | ..................... | G06Q 10/06 705/37 |
| 7,243,074 B1* | 7/2007 | Pennisi, Jr. | ...... | G06Q 10/06312 705/7.22 |
| 7,313,530 B2* | 12/2007 | Smith | .................... | G06Q 10/04 705/7.24 |
| 8,639,551 B1* | 1/2014 | Feng | ............. | G06Q 10/063118 705/7.17 |
| 9,378,511 B2* | 6/2016 | Chafle | ............ | G06Q 10/063116 |
| 10,037,503 B2* | 7/2018 | Zhang | ............. | G06Q 10/06315 |
| 10,636,108 B2* | 4/2020 | Eyler | ................ | G01C 21/3438 |
| 10,706,487 B1* | 7/2020 | Chachra | ................ | G06N 7/005 |
| 10,740,701 B2* | 8/2020 | Zhang | .................... | G06F 17/18 |

(Continued)

OTHER PUBLICATIONS

Boydell, Briony, Capacity Planning and Management, Chapter 7 University of Portsmouth, 2017 (Year: 2017).*

(Continued)

*Primary Examiner* — Scott L Jarrett

(74) *Attorney, Agent, or Firm* — Keller Preece PLLC

(57) ABSTRACT

The present disclosure relates to systems, non-transitory computer-readable media, and methods for generating and utilizing provider device balance graphs reflecting device utilization ratio between provider devices and requester devices. In particular, in one or more embodiments, the disclosed systems determine and utilize probabilities to generate and provide provider device balance graphs based on probability distributions for device utilization ratios. The disclosed systems can apply various scaling models to address seasonality, special events, and/or differences between regions. The disclosed systems can also apply thresholds to generate device incentive graphs that more efficiently deploy provider devices across a transportation matching system.

20 Claims, 13 Drawing Sheets

(56) References Cited

U.S. PATENT DOCUMENTS

| | | | | |
|---|---|---|---|---|
| 2003/0014288 A1* | 1/2003 | Clarke | ............ | G06Q 10/06316 705/7.26 |
| 2003/0084125 A1* | 5/2003 | Nagda | ................... | G06Q 30/08 709/219 |
| 2008/0114629 A1* | 5/2008 | Pavlov | ................... | G06Q 50/30 705/347 |
| 2008/0195428 A1* | 8/2008 | O'Sullivan | ............ | G06Q 10/00 705/6 |
| 2010/0082410 A1* | 4/2010 | Baudin | .............. | G06Q 30/0201 705/7.29 |
| 2010/0185486 A1* | 7/2010 | Barker | ............... | G06Q 30/0202 705/7.31 |
| 2010/0228598 A1* | 9/2010 | Seuken | ................. | G06Q 40/12 705/7.35 |
| 2013/0144831 A1* | 6/2013 | Atlas | ...................... | G06Q 10/06 706/50 |
| 2015/0242944 A1* | 8/2015 | Willard | .............. | G06Q 30/0284 705/5 |
| 2017/0193625 A1* | 7/2017 | Fan | ........................ | G06Q 50/01 |
| 2017/0293925 A1* | 10/2017 | Marueli | ................. | G06Q 50/30 |
| 2017/0301054 A1* | 10/2017 | Sangoi | ................... | G06Q 10/02 |
| 2018/0060990 A1* | 3/2018 | Liu | ........................ | G06Q 50/30 |
| 2018/0101878 A1* | 4/2018 | Marueli | ............. | G01C 21/3438 |
| 2018/0121847 A1* | 5/2018 | Zhao | ................ | G06Q 10/06315 |
| 2018/0137594 A1* | 5/2018 | Marco | .................... | G06Q 50/30 |
| 2018/0314998 A1* | 11/2018 | Liu | ................. | G06Q 10/06313 |
| 2018/0315148 A1* | 11/2018 | Luo | ........................ | G06Q 50/30 |
| 2018/0322420 A1* | 11/2018 | Marco | .................... | G06Q 50/30 |
| 2019/0154454 A1* | 5/2019 | Verma | ................ | G06Q 30/0284 |
| 2019/0205812 A1* | 7/2019 | Afzal | .................... | H04W 4/029 |
| 2019/0311453 A1* | 10/2019 | Schneider | ........ | G06Q 10/06315 |
| 2020/0005198 A1* | 1/2020 | Nazerzadeh | .......... | G06Q 10/02 |
| 2020/0111111 A1* | 4/2020 | Suzuki | ................... | G06Q 10/04 |
| 2020/0120037 A1* | 4/2020 | Zhang | .................... | G06Q 50/30 |
| 2020/0134747 A1* | 4/2020 | Zhang | ................ | G06F 16/9537 |
| 2020/0169523 A1* | 5/2020 | Li | .......................... | H04L 51/14 |
| 2020/0226694 A1* | 7/2020 | Chen | .................. | G06F 16/9535 |
| 2020/0279193 A1* | 9/2020 | Bright | .................. | G06Q 50/30 |
| 2020/0286106 A1* | 9/2020 | Candeli | .................... | G06Q 10/02 |
| 2020/0356927 A1* | 11/2020 | Abelenda | .......... | G06Q 10/06311 |
| 2021/0142669 A1* | 5/2021 | O'Sullivan | ............ | G06Q 50/30 |

OTHER PUBLICATIONS

Cramer, Judd et al., Disruptive Change in the Taxi Business: The Case of Uber American Economic Review: Papers & Proceedings, vol. 106, No. 5, 2016 (Year: 2016).*

Dyer, John, Understanding the Demand/Capacity Curve Industry Week, Oct. 8, 2013 (Year: 2013).*

Bai, Jiaru et al., Coordinating supply and demand on an on-demand service platform with impatient customers Singapore Management University, Jun. 2019 (Year: 2019).*

Zha, Liteng, Modeling and Analysis of On-Demand Ride-Sourcing Markets University of Florida, 2017 (Year: 2017).*

* cited by examiner

| Probability Distribution Device Balance Measures Ranked | Bins | Bin Range |
|---|---|---|
| 5.1<br>4.8 | 100 | 4.6 - 5.1 |
| 4.5<br>3.2 | 90 | 3.2 - 4.5 |
| 3.1<br>2.6 | 80 | 2.6 - 3.1 |
| 2.5<br>2.3 | 70 | 2.3 - 2.5 |
| 2.2<br>2.0 | 60 | 2.0 - 2.2 |
| 1.9<br>1.7 | 50 | 1.7 - 1.9 |
| 1.5<br>1.4 | 40 | 1.4 - 1.5 |
| 1.3<br>1.1 | 30 | 1.1 - 1.3 |
| 1.0<br>0.8 | 20 | 0.8 - 1.0 |
| 0.7<br>0.4 | 10 | 0.0 - 0.7 |

*Fig. 5*

GENERATING AND COMMUNICATING DEVICE BALANCE GRAPHICAL REPRESENTATIONS FOR A DYNAMIC TRANSPORTATION SYSTEM

BACKGROUND

In recent years, the popularity and usage of on-demand transportation matching systems have steadily increased. Indeed, the proliferation of web and mobile applications enable requesting devices to submit transportation requests via on-demand transportation matching systems and identify available provider devices that can provide transportation services from one geographic location to another. In many circumstances, conventional transportation matching systems also provide digital communications regarding fluctuations in requesting device demand to allow provider devices to select times for providing transportation services. For example, conventional transportation matching systems can provide a graph reflecting requester device demand over time in an effort to forecast times for provider devices to provide transportation services. However, conventional transportation matching systems suffer from a number of disadvantages with respect to accuracy and efficiency of implementing computing systems.

For instance, although many conventional transportation systems generate and transmit fluctuations in demand to provider devices, conventional systems often provide these digital communications in a manner that is misleading to provider devices. For example, communicating linear demand can provide inaccurate, misleading, and unhelpful information when there is a large spike in demand within a communicated time period. In such circumstances, for instance, demand for other time periods becomes distorted, which leads driver devices to over-commit during some time periods (e.g., during a time period corresponding to a large spike) and under-commit at other time periods. For example, when there is a large event or a holiday weekend rush hour, conventional systems do not provide an accurate indication to provider devices as to when to provide transportation services within a particular target time period.

In addition, this inaccurate communication of provider device incentives can also lead to inefficiencies in conventional transportation matching systems. Indeed, because digital communications fail to accurately convey transportation opportunities, conventional transportation matching systems often experience requester device imbalances (e.g., excessive levels of demand from requesting devices relative to transportation devices) or provider device imbalances (e.g., excessive levels of transportation devices relative to demand from requesting devices). These imbalances often lead to high wait times (for requesting devices and/or provider devices) and excessive burdens on computing resources (e.g., inefficiencies at the server in responding to requesting devices and provider devices due to unbalanced availability relative to demand). For example, conventional systems often face excessive computational overhead due to an imbalance in requester devices or provider devices as these devices repeatedly query servers for transportation matches, transportation updates, or other information due to lag resulting from uneven distribution across the transportation matching system. In addition, this can negatively affect both user experience and provider experience, yielding retention problems for conventional systems.

These along with additional problems and issues exist with regard to conventional transportation matching systems.

BRIEF SUMMARY

Embodiments of the present disclosure provide benefits and/or solve one or more of the foregoing or other problems in the art with systems, non-transitory computer-readable media, and methods for generating provider device balance graphs reflecting device utilization ratios between provider devices and requester devices. For example, the disclosed systems can determine market balance measures over a target time period based on driver supply hours and requester device application sessions within the target time period. Further, the disclosed systems can utilize the market balance measures to generate and display provider device balance graphs to provider devices. Moreover, the disclosed system can apply various scaling models to create an intuitive visual scale to address seasonality, special events, and/or differences between regions. The disclosed systems can also apply thresholds to generate smooth visual scales that allow driver devices to more accurately determine driving schedules. In this manner, the disclosed systems can avoid distortions that result from large fluctuations in requestor device demand and provide a more accurate reflection of provider device incentives across a transportation matching system.

For example, in one or more embodiments, the disclosed systems determine device utilization ratios for a period of time based on projections for device utilization for requester computing devices and device utilization for provider computer devices across time periods. Then, the disclosed systems can utilize a probability distribution for a representative time period to determine probabilities for the device utilization ratios. In one or more embodiments, the disclosed systems map device utilization rations and/or probabilities to "bins" and utilize those bins to generate a provider device balance graph. By utilizing device utilization ratios between utilization of provider devices and requester devices, the disclosed systems can display provider device balance graphs that more accurately reflect transportation times for provider devices, that allow for more efficient scheduling of provider devices, and that lead to more efficient operation of implementing computer systems.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

The detailed description provides one or more embodiments with additional specificity and detail through the use of the accompanying drawings, as briefly described below.

FIG. 5 illustrates binning probabilities according to determined bin ranges in accordance with one or more embodiments.

DETAILED DESCRIPTION

Figure 1:
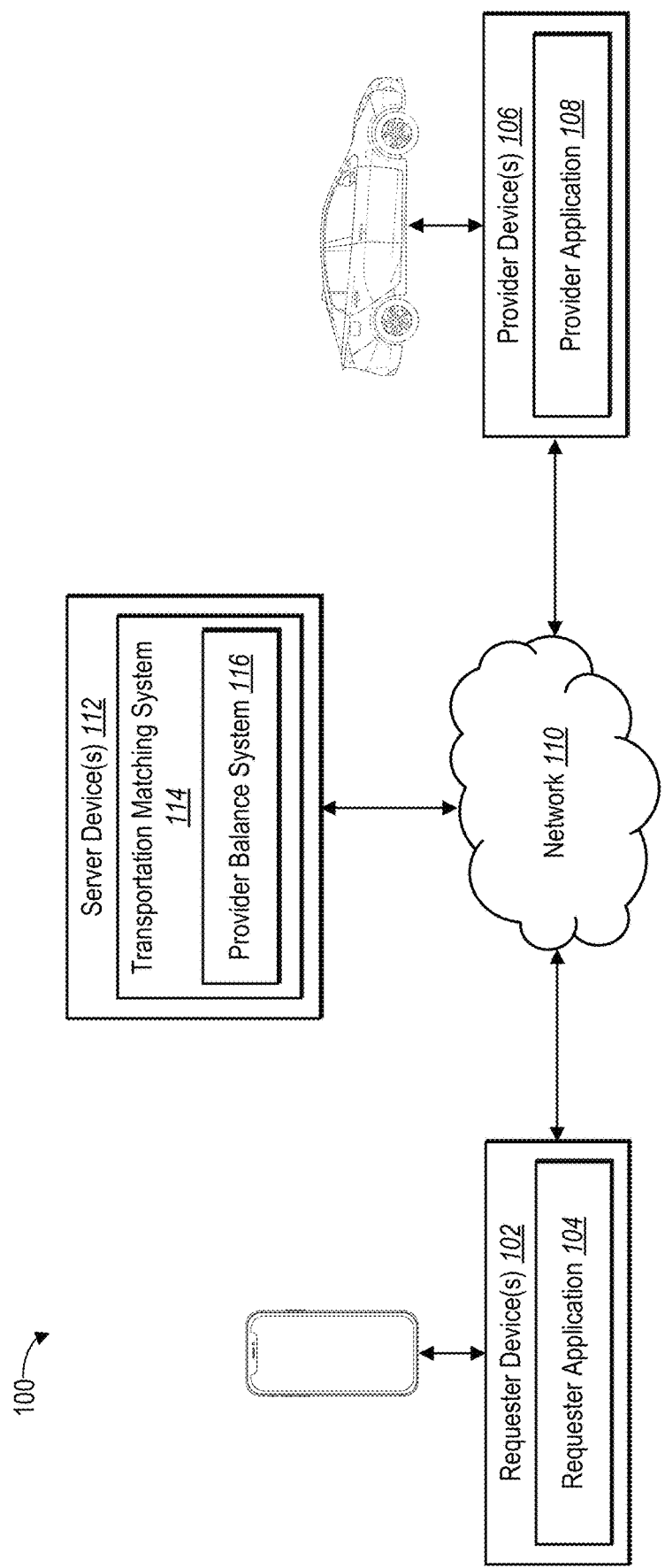
FIG. 1 illustrates a diagram of an environment in which a provider balance system can operate in accordance with one or more embodiments.

This disclosure describes one or more embodiments of a provider balance system that generates provider device balance graphs reflecting device utilization ratios between provider devices and requester devices. More specifically, the provider balance system can determine device utilization ratios for various time periods based on projections for utilization of provider devices and requester devices. The provider balance system can utilize the device utilization ratios to generate a provider device balance graph. By utilizing a provider device balance graph that reflects such market balance metrics, the provider balance system can more accurately represent provider device utilization rate and earnings relative to conventional systems. Indeed, the provider balance system can avoid distortions in driver device incentives and reduce inefficiencies across transportation matching systems that result from pure demand metrics.

To illustrate, the provider balance system can determine predicted requester computing device application sessions and predicted computing device availability within a given region and within a given time period. Then, the provider balance system can determine device utilization ratios for the given time period based on the forecast measures. Further, the provider balance system can determine probabilities of the device utilization ratios. The provider balance system can then generate and provide a provider device balance graph portraying the probabilities for efficient communication of provider incentives and deployment of provider devices.

As mentioned, the provider balance system can generate and utilize various predicted device utilization measures for provider devices and requestor devices. In one or more embodiments, the provider balance system utilizes a number driver supply hours to forecast driver device utilization and utilizes a number of requester device application sessions to forecast requester device utilization. However, the provider balance system can utilize a variety of particular metrics to predicted device utilization. For example, the provider balance system can forecast a number of requests, a number of hours required to fulfil requests, or a cumulative distance needed to be driven to fulfil requests. Further, the provider balance system can forecast a number of providers, a number of provider miles, or a number of transportation services (e.g., rides).

As discussed above, the provider balance system can utilize forecast metrics to generate device utilization ratios. More specifically, in one or more embodiments, the provider balance system can generate the device utilization ratios as a ratio of requester device application sessions and provider device availability. For example, the provider balance system can generate the device utilization ratios by determining the ratio of the number of application sessions over a time period to a number of driver supply hours for the same time period.

In addition, as mentioned, the provider balance system can also determine probabilities. In particular, the provider balance system can determine probabilities by applying a probability distribution to forecasted device utilization ratios. For example, the provider balance system can determine a probability distribution that reflects probabilities of device utilization ratios for a representative time period (e.g., an average week). The provider balance system can then utilize the probability distribution to determine probabilities. To illustrate, the provider balance system can utilize a probability distribution to determine percentile bins that reflect ranges of cumulative probabilities and corresponding ranges of device utilization ratios. The provider balance system can then map forecast device utilization ratios to the appropriate percentile bins to generate probabilities.

In some embodiments, the provider balance system can also generate device utilization ratios by applying device balance thresholds. Indeed, the provider balance system can further avoid distortion by applying upper and/or lower thresholds of device utilization ratios. For example, in some embodiments, the provider balance system can constrain the minimum device utilization ratio (or probability) to a lower threshold (e.g., a 10 percent lower bound). Similarly, the provider balance system can map the maximum device utilization ratio (or probability) to an upper threshold (e.g., a 100 percent upper bound).

As mentioned above, the provider balance system can also apply various scales to device utilization ratios. For instance, in some embodiments, the provider balance system can apply a seasonal scaling to reflect variations in device utilization ratios across seasons. In addition, the provider balance system can apply an event scaling (e.g., multiplicatively) to reflect variations in device utilization ratios specific to particular events.

The provider balance system can also generate and utilize provider device ridership metrics. For example, in some embodiments, the provider balance system generates provider device ridership metrics that reflect projected earnings corresponding to provider devices in light of ridership corresponding to requestor devices. Specifically, the provider balance system can generate ridership metrics based on a projected earnings metric and the radical of a projected number of rides. The provider balance system can utilize these earnings-ridership metrics to generate one or more provider device balance graphs.

As just mentioned, the provider balance system can generate provider device balance graphs and can provide these provider device balance graphs for display in graphical user interfaces via provider devices. For example, the provider balance system can generate a timeline of probabilities and provide the timeline for display to provider devices to more efficiently distribute provider devices across different times (e.g., hours) within a target time period (e.g., a day). The provider balance system can also generate and provide recommend transportation schedules for provider devices based on device utilization ratios.

The provider balance system provides many advantages and benefits over conventional systems and methods. For example, by utilizing device balance metrics and/or probability distributions the provider balance system can improve accuracy relative to conventional systems. Specifically, the provider balance system can generate and display provider device balance graphs that accurately communicate provider device incentives without undue distortion caused by spikes or other fluctuations in requester device demand. The provider balance system can utilize probability distributions to determine provider device balance graphs that are smoother and easier to understand and that more accurately convey transportation times to provider devices.

Additionally, the provider balance system improves efficiency for the implementing transportation matching system. Indeed, the provider balance system more accurately conveys incentives across provider device transportation times and therefore reduces imbalances across provider devices and requester devices. The provider balance system can thus reduce spike imbalances between provider devices and requester devices and reduce the burdens on implementing computing systems in seeking to matching provider devices and requester devices under such circumstances. For example, the provider incentive system can reduce the number of repeat requests for providers and/or requesters, queries for updates, and/or queries for transportation provider status reports that result from device imbalances. The provider balance system also provides better projections and yields better requester and provider experience by ensuring that provider devices align to demands from requester devices.

As illustrated by the foregoing discussion, the present disclosure utilizes a variety of terms to describe features and advantages of the provider balance system. Additional detail is now provided regarding the meaning of such terms. For example, as used herein, the term "transportation request" (or "request") refers to a query, demand, or invitation for transportation services. To illustrate, a requester can interact with one or more user interfaces of a requester application on a requester device to configure a transportation request (e.g., to indicate a requested pickup location, a requested drop-off location, a requested type of transportation, and/or a requested time of transportation), and then submit the transportation request to the transportation matching system. As used herein, the terms "requester" refers to an individual that has submitted (or will submit) a transportation request. Similarly, a "requester device" (or "requester computing device") refer to a computing device that submits (or has submitted) a request (e.g., a computing device associated with a requestor).

Further, as used herein, the term "provider" refers to an individual, entity, or vehicle that provides transportation services. Moreover, the term "provider device" (or "provider computing device") refer to a computing device associated with a provider (e.g., a computing device associated with a driver or automated vehicle). Additional detail regarding provider devices and requester devices is provided below (e.g., in relation to FIG. 1).

In addition, as used herein, the term "predicted device utilization" refers to a forecast metric or measurement reflecting an extent that one or more devices will be used. To illustrate, a predicted device utilization can include a metric that conveys a predicted supply, and/or demand of requester devices and/or provider devices. As mentioned, the provider balance system can generate a predicted device utilization for requester computing devices as a forecast measure of requester computing device application sessions.

In addition, as used herein, a predicted device utilization for provider computing device can include a predicted metric of a supply of transportation services or provider device availability. In particular, predicted device utilization for provider computing devices can include a number of hours utilized to provide transportation services during a specified time (e.g., a predicted number of driver hours available to provide transportation services during a specified time).

Further, as used herein, the term "device utilization ratios" refers to a metric reflecting both predicted device utilization for provider computing devices and requester computing devices. In particular, a device utilization ratio can include a ratio of the number of application sessions over a time period to a number of driver supply hours for the same time period.

Also, as used herein, the term "probabilities" refers to a likelihood of a particular result (e.g., a probability of a utilization ration determined based on a probability distribution). In particular, the provider balance system can determine a probability distribution (e.g., a correlation between probabilities and values of a variable) of device utilization ratios. The provider balance system can then map device utilization ratios to probabilities utilizing the probability distribution. For example, a device utilization ratio of 0.5 may map to a probability of 15 (e.g., a 15% inverse cumulative probability of achieving a 0.5 device utilization ratio or lower during the time period).

In addition, as used herein, the term "provider device balance graph" refers to a visual representation of relative supply and/or demand. In particular, the term "provider device balance graph" can include a graphical representation of device utilization ratios, probabilities, and/or provider device earnings-ridership metrics. To illustrate, a provider balance system can include provider device balance graph in a graphical user interface within a provider application.

Additionally, as used herein, the term "bins" refers to a grouping or range of data. In particular, the term "bins" can include a range of device utilization ratios corresponding to a range of probabilities. For example, the provider balance system 116 can identify an 80%-90% probability bin defined by a range of device utilization ratios corresponding to an 80% inverse cumulative probability and a 90% inverse cumulative probability.

Further, as used herein, the term "provider device ridership metric" (or "earnings-ridership metric") refers to a metric based on earnings for a provider and ridership. In particular, the term "provider device ridership metric" can include metric based on a projected earnings metric and the radical of a projected number of rides. Additionally, as used herein, the term "radical" refers to the root of a number or quantity. In particular, the term "radical" can include a square root, a cube root, or a root with another radicand.

Further, as used herein, the term "event modifier" refers to a metric corresponding to an event. In particular, the term "event modifier" can include a value corresponding to a scale at which an event will escalate demand in a given time and/or location. To illustrate, an event modifier can include a variety of metrics and/or measures corresponding to increased demand expected and/or experienced as a result of an event such as a concert, sporting event, performance, etc. Similarly, a "seasonal modifier" can include a metric corresponding to a particular season (e.g., increased demand expected due to a particular month, week, or other time of year).

Additional detail will now be provided regarding the provider balance system in relation to illustrative figures portraying exemplary embodiments. In particular, FIG. 1 illustrates an environment 100 including requester device(s) 102, each implementing a requester application 104, and provider device(s) 106, implementing a provider application 108. The requester device(s) 102 communicate, via a network 110, with server device(s) 112. The server device(s) 112 can implement a transportation matching system 114, which in turn can include a provider balance system 116.

Although FIG. 1 illustrates the provider balance system 116 implemented via the server device(s) 112, the provider balance system 116 can be implemented via other components. For example, the provider balance system 116 can be implemented in whole, or in part, by the requester device(s) 102 and/or the provider device(s) 106.

The requester device(s) 102 can include various types of computing devices. For example, the requester device(s) 102 can include smart phones, tablets, smart watches, laptop computers, or other mobile computing devices, such as further explained below with reference to FIG. 10. Additionally, the requester application 104 can include various types of requester applications. For example, the requester application 104 can be a web application (e.g., accessed using a web browser) or a native application provided by the transportation matching system 114 for communicating with and accessing the services of the transportation matching system 114 (e.g., to request transportation). Similarly, the provider device(s) 106 can include various types of computing devices (e.g., a smartphone or integrated computing device within an autonomous vehicle), and the provider application 108 can include a web or native application for communicating with and accessing the services of the transportation matching system 114 (e.g., to provide transportation services to one or more requesters). Additionally, the server device(s) 112 can include one or more computing devices, such as those explained below with reference to FIG. 10.

The requester device(s) 102, the provider device(s) 106, and the transportation matching system 114 may communicate by way of the network 110, which can include one or more communications networks using communication platforms and technologies suitable for transporting data and/or communication signals, examples of which are described with reference to FIG. 10.

The transportation matching system 114 dynamically matches transportation requests received from requesters (e.g., requesters associated with requester device(s) 102) with available transportation service providers (e.g., transportation providers associated with the provider device(s) 106). To illustrate, a transportation matching system can identify transportation requests, identify potential transportation provider devices, determine locations of requester devices and provider devices, and match provider devices and requester devices based on a variety of criteria. One will appreciate that the supply of transportation providers does not always match the demand of transportation requesters. Accordingly, the transportation matching system 114 can perform various actions for determining and communicating supply and demand to providers so that providers can drive at appropriate/optimal times. In accordance with one or more embodiments disclosed herein, the transportation matching system 114 utilizes the provider balance system 116 to determine, visualize, and communicate supply and demand information.

Figure 2A:
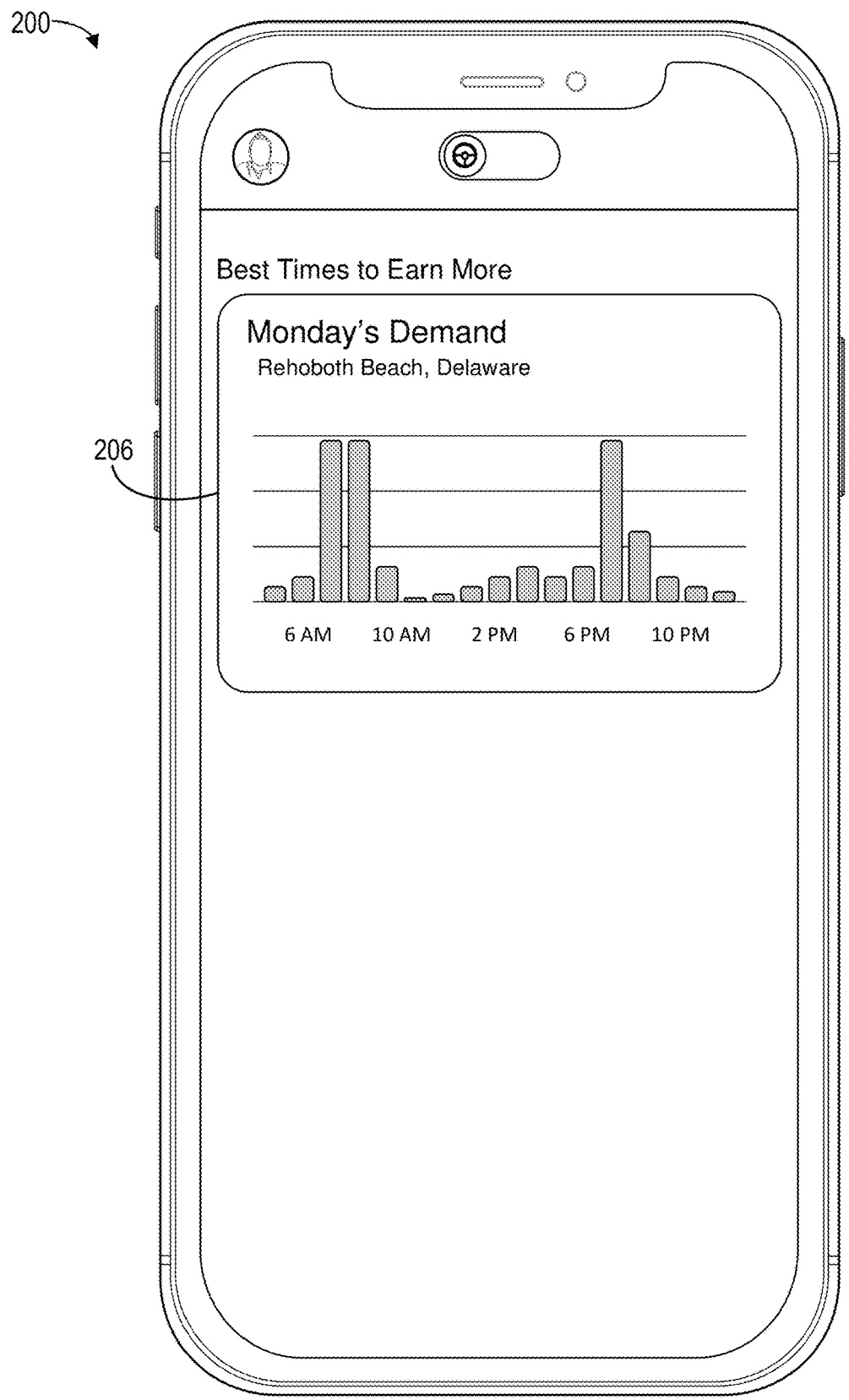
FIGS. 2A-2C illustrate example graphical user interfaces for a provider balance system in accordance with one or more embodiments.
Figure 2B:
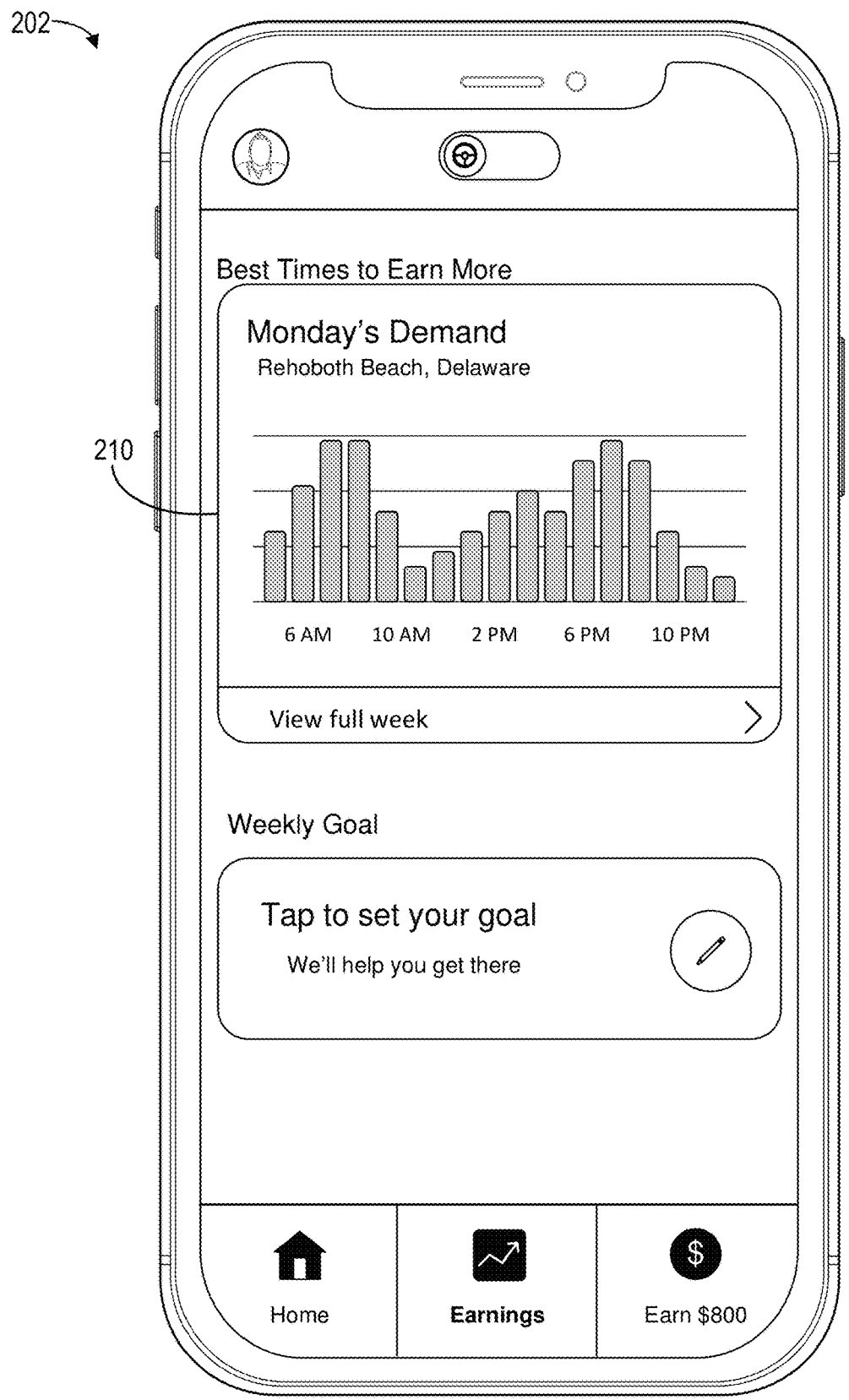
Figure 2C:
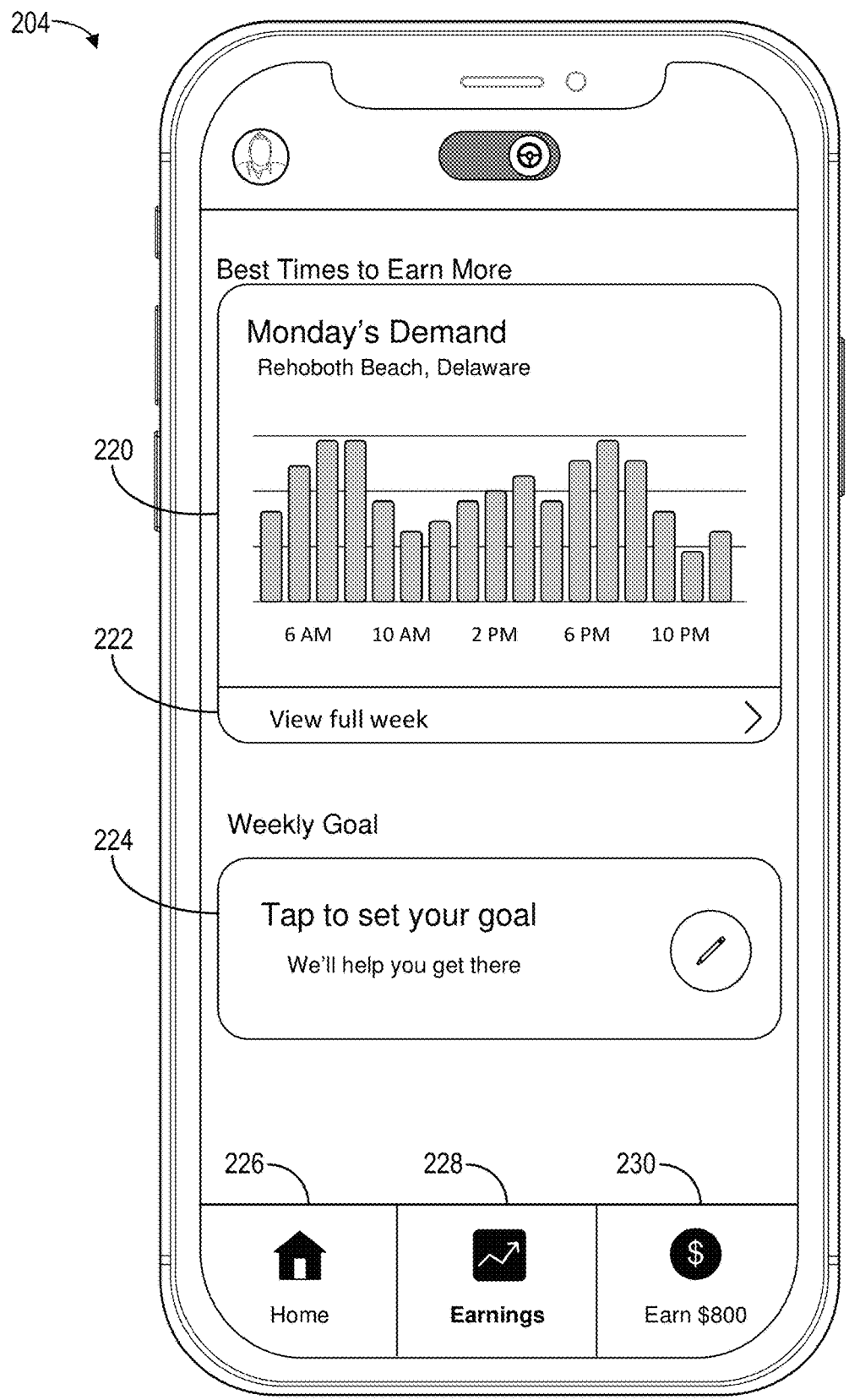

As discussed above, the provider balance system 116 can generate provider device balance graphs. FIGS. 2A-2C illustrate example graphical user interfaces utilized by one or more transportation matching systems. In particular, FIG. 2A illustrates a user interface generated in accordance with one or more conventional systems described above. Specifically, FIG. 2A illustrates a user interface 200 that visualizes demand only. Moreover, FIGS. 2B-2C illustrate provider device balance graphs generated by the provider balance system 116 in accordance with one or more embodiments. In particular, FIG. 2B illustrates a provider device balance graphical user interface 202 with a provider device balance graph 210 visualizing device utilization ratios and FIG. 2C illustrates a provider device balance graphical user interface 204 with a provider device balance graph 220 visualizing probabilities.

As shown in FIG. 2A, conventional systems generate user interfaces with a visualization 206 that portrays demand. However, because the visualized time period includes some demand "spikes" (where some hours have a much higher demand than others), it appears as if the demand is very low for most of the displayed time period. Accordingly, this approach can mislead providers, causing an over-supply of driver devices during these "spike" time periods and an under-supply of driver devices during other time periods.

In contrast, the provider balance system 116 can generate device incentive graphs that more accurately and efficiently distribute provider devices. As shown in FIG. 2B, the provider device balance graph 210 visualizes device utilization ratios over the same time period visualized in FIG. 2A. More specifically, the provider device balance graph 210 visualizes device utilization ratios determined based on forecasted requester device sessions and driver supply hours. As shown, the provider device balance graph 210 is much less distorted and avoids drastic spikes throughout the target time period. The provider device balance graph 210 in FIG. 2B is much more efficient in distributing provider devices because it illustrates relative balance between requester devices and provider devices over the time period rather than raw demand.

As mentioned above, the provider balance system 116 can also generate device incentive graphs that reflect probabilities. FIG. 2C illustrates a provider device balance graph 220 that reflects probabilities. That is, the provider device balance graph 220 reflects device utilization ratios that have been modified utilizing a probability distribution. Specifically, each of the bars in the provider device balance graph 220 reflect a cumulative probability (e.g., an inverse cumulative probability) of a corresponding forecast measure. In one or more embodiments, the provider balance system 116 utilizes a probability distribution to determine bins for device utilization ratios. As shown in FIG. 2C, the visualization of probabilities further smooths the device incentive graph in order to communicate to the provider the relative benefit of providing transportation services at various times.

It will be appreciated that the provider balance system 116 can provide a variety of user interface elements for interacting with device incentive graphs. For example, as shown in FIG. 2C, the provider device balance graphical user interface 204 can include a time selection element 222. For example, a time selection element 222 can include a user interface element for selecting time periods. Upon detecting user interaction with the time selection element 222, the provider balance system 116 can include a provider device balance graph for a different time period. For example, upon user interaction with the time selection element 222 the provider balance system 116 can generate a provider device balance graph for a specified week rather than a specified day.

As also shown in FIG. 2C, the provider device balance graphical user interface 204 can also include a set goal button 224. Upon detecting selection of the set goal button, the provider balance system 116 can present the provider device with a scheduling graphical user interface. In particular the provider balance system 116 can generate scheduling elements that automatically assist the provider to select times to provide transportation services. Additional detail regarding suggesting a transportation service schedule via a scheduling graphical user interface is provided below (e.g., in relation to FIG. 7).

As shown, the provider device balance graphical user interface 204 can also include other user interface elements, such as a home tab 226, an earnings tab 228, and a scheduling tab 230. In one or more embodiments, the provider balance system 116 can display a default or home screen in response to detecting selection of the home tab 226. The provider balance system 116 can also present the provider device balance graphical user interface 204 in response to detecting selection of the earnings tab 228. Further, the provider balance system 116 can present a scheduling graphical user interface upon detecting selection of the scheduling tab 230 (e.g., a scheduling interface that includes scheduled transportation times to achieve a particular goal).

As discussed above, the provider balance system 116 can determine device utilization ratios and probabilities and generate provider device balance graphs. For example, FIG. 3 illustrates a series of acts 302-310 utilized to generate a provider device balance graph in accordance with one or more embodiments.

Figure 3:
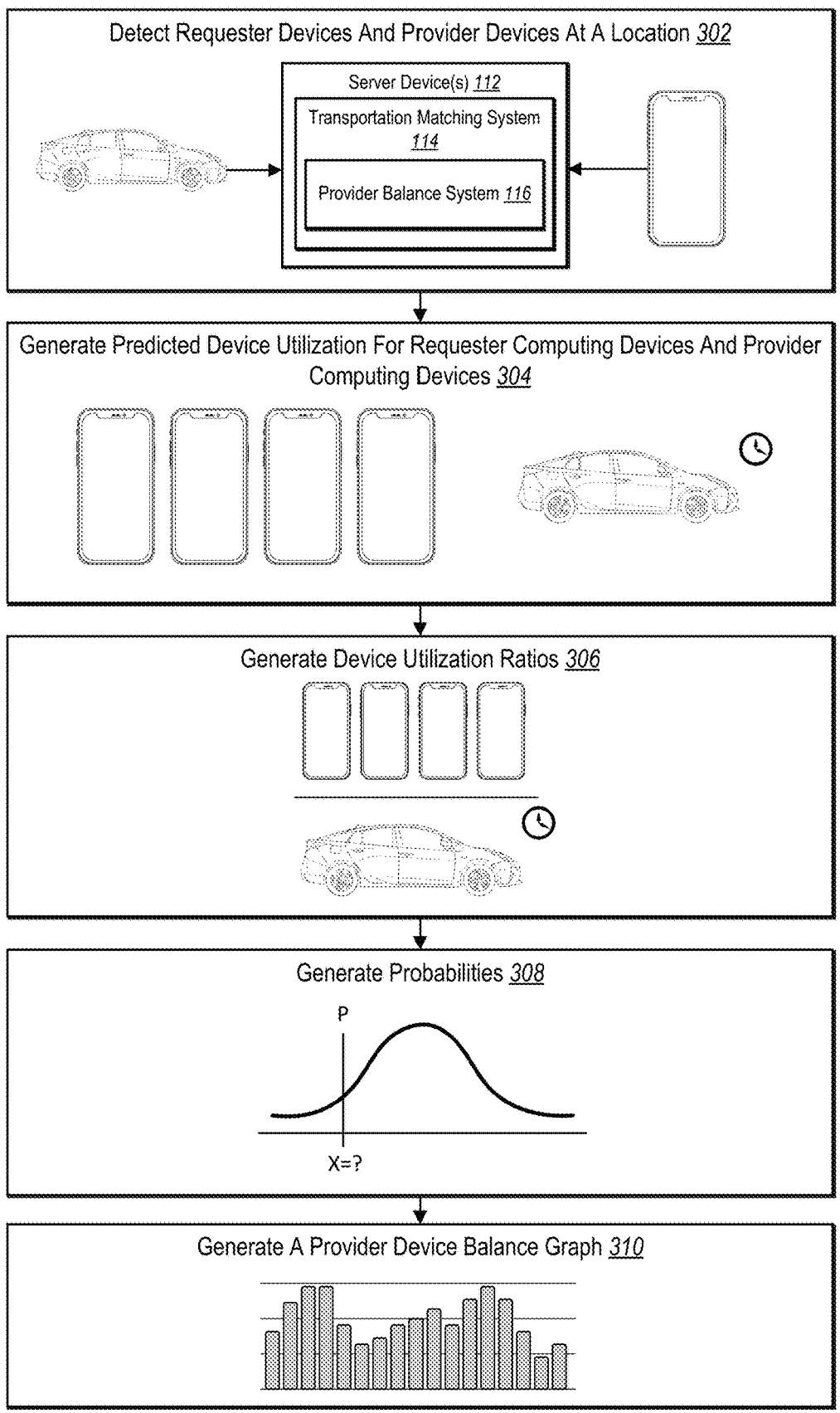
FIG. 3 illustrates an overview of generating a provider device balance graph in accordance with one or more embodiments.

Specifically, as shown in FIG. 3, the provider balance system 116 performs an act 302 of detecting requester devices and provider devices at a location. In particular, the provider balance system 116 can track historical and current data as to the volume and type of interactions of both requester device(s) 102 and provider device(s) 106 over various locations where the transportation matching systems offers transportation services. For example, the provider balance system 116 can monitor the number of application sessions from requester devices over time for different geographic regions. Similarly, the provider balance system 116 can monitor the number of provider devices (or provider device hours) over time for different geographic regions. In addition the provider balance system 116 can monitor a variety of other metrics, such as the number of rides, number of application sessions, miles of transportation provided, earnings received (e.g., earnings per driver device), number of requests received, number of riders, etc. Accordingly, the provider balance system 116 can actively monitor activity across the transportation matching system and determine various metrics with regard to requester devices and provider devices.

As shown in FIG. 3, the provider balance system 116 also performs an act 304 of generating predicted device utilization for requester computing devices and provider computing devices. For instance, the provider balance system 116 can determine forecast measures of provider computing device availability and forecast measures of requester computing device application sessions. In one or more embodiments, the provider balance system 116 generates these forecasts based on historical data from requester device(s) 102 and/or provider device(s) 106 (e.g., from the act 304). The provider balance system 116 can utilize various historical data, including ride data, seasonal data, and/or event data. As will be discussed in greater detail below, in one or more embodiments, the provider balance system 116 can also apply seasonal and/or event scaling to a provider device balance graph.

The provider balance system 116 can utilize a variety of analytical techniques to determine forecast measures. For example, in some embodiments, the provider balance system 116 can analyze historical metrics (e.g., historical application sessions or historical provider device availability) utilizing regression techniques to determine typical or average provider device availability or requester device application sessions. The provider balance system 116 can also train and utilize machine learning models to generate these forecast measures, such as neural networks (e.g., a convolutional neural network), autoencoders, linear regression models, logistic regression models, vector machines, decision tress, Bayesian networks, conditional random fields, or Hidden Markov models.

Using one or more forecasting models, the provider balance system 116 can generate predicted device utilization for requester computing devices and provider computing devices (e.g., forecast measures of provider computing device availability and requester computing device application sessions). These measures can take a variety of specific forms. For example, the provider balance system 116 can forecast a number of times an application connects to a server, a number of requests from a transportation application, a number of application executions (e.g., a number of times an application is opened), payments received via a transportation application, or a number of completed rides arranged via a transportation application. Similarly, the provider balance system 116 can forecast a number of provider devices during a particular time, a number of provider device supply hours (e.g., a number of hours that provider devices are available), a number of miles of transportation services provided by provider devices, or an amount of earnings (e.g., dollars received per driver device).

In addition to generating predicted device utilization for requester computing devices and provider computing devices, the provider balance system 116 can also receive forecast measures (e.g., from the transportation matching system 114, or from another source via the network 110). As discussed above, the forecast measures can reflect various measurements of supply and demand for the transportation matching system 114.

Additionally, the provider balance system 116 can perform an act 306 of generating device utilization ratios. In one or more embodiments, the provider balance system 116 determines device utilization ratios based on a supply forecast measure with respect to requester devices (e.g., demand) and a forecast measure with respect to provider devices (e.g., supply). More specifically, the provider balance system 116 can generate the device utilization ratios based on a ratio of a device utilization for requester computing devices and device utilization for provider computing devices (e.g., a ratio of a demand forecast measure to a supply forecast measure). As shown in FIG. 3, the provider balance system 116 can determine the device utilization ratios based on a ratio of requester device application sessions for a given time period to driver supply hours over the time period.

Then, as shown in FIG. 3, the provider balance system 116 can perform an act 308 of generating probabilities. In particular, the provider balance system 116 can determine a probability distribution that reflects the probability across forecast measures. For instance, the provider balance system 116 can determine a probability distribution reflecting probabilities of different device utilization ratios for any particular time period and/or location. As will be discussed in greater detail below with regard to FIG. 4, the provider balance system 116 can utilize a probability distribution to generate the probabilities.

The provider balance system 116 can generate a probability distribution by analyzing historical measures with regard to provider devices and requester devices. For instance, the provider balance system 116 can determine historical device utilization ratios for a particular location for a given time period (e.g., an hour, a day, or a week). The provider balance system 116 can analyze the historical device utilization ratios and determine the mean, variance, and/or standard deviation defining the probability distribution. In this manner, the provider balance system 116 can generate probability distributions for various locations (e.g., geographic regions) and times (e.g., hours, days, weeks or months).

The provider balance system 116 can then utilize the probability distribution to determine probabilities. Specifically, the provider balance system 116 can determine individual probabilities of device utilization ratios, cumulative probabilities of device utilization ratios, and/or cumulative percentile bins corresponding to device utilization ratios. The provider balance system 116 can then utilize one or more of these metrics as probabilities.

Upon determining the probabilities, the provider balance system 116 can perform an act 310 of generating a provider device balance graph. In one or more embodiments, the provider balance system 116 generates the provider device balance graph based on the probabilities. For example, the provider balance system 116 can plot cumulative probabilities (e.g., inverse cumulative probabilities) for a plurality of times within a time period. To illustrate, the provider balance system 116 can map a device utilization ratio for a time period to a cumulative probability bin (e.g., 90-95% probability of having a device utilization ratio at or below the determined value) and then plot a representation of the cumulative probability bin for the time period.

The provider balance system 116 can also generate the provider device balance graph 210 based on a variety of other measures and/or metrics. For example, as will be discussed below with regard to FIG. 6, the provider balance system 116 can generate a provider device balance graph that reflects earnings-ridership metrics.

Accordingly, the provider balance system 116 can select which metric and/or measure to visualize via the provider device balance graph. For example, the provider balance system 116 can select between provider device measures or earnings-ridership measures based at least in part on the readability (i.e., the ease with which a user can understand the meaning of a visualization) of each potential visualization. The provider balance system 116 can determine the readability of a potential visualization based on the scale of a given visualization (e.g., select the metric with the smallest range shown in the provider device balance graph to reduce spikes). Further, the provider balance system 116 can select a measure to illustrate in a provider device balance graph based on provider device preferences and/or previous provider device(s) 106 interactions with provider device balance graphs.

Figure 4:
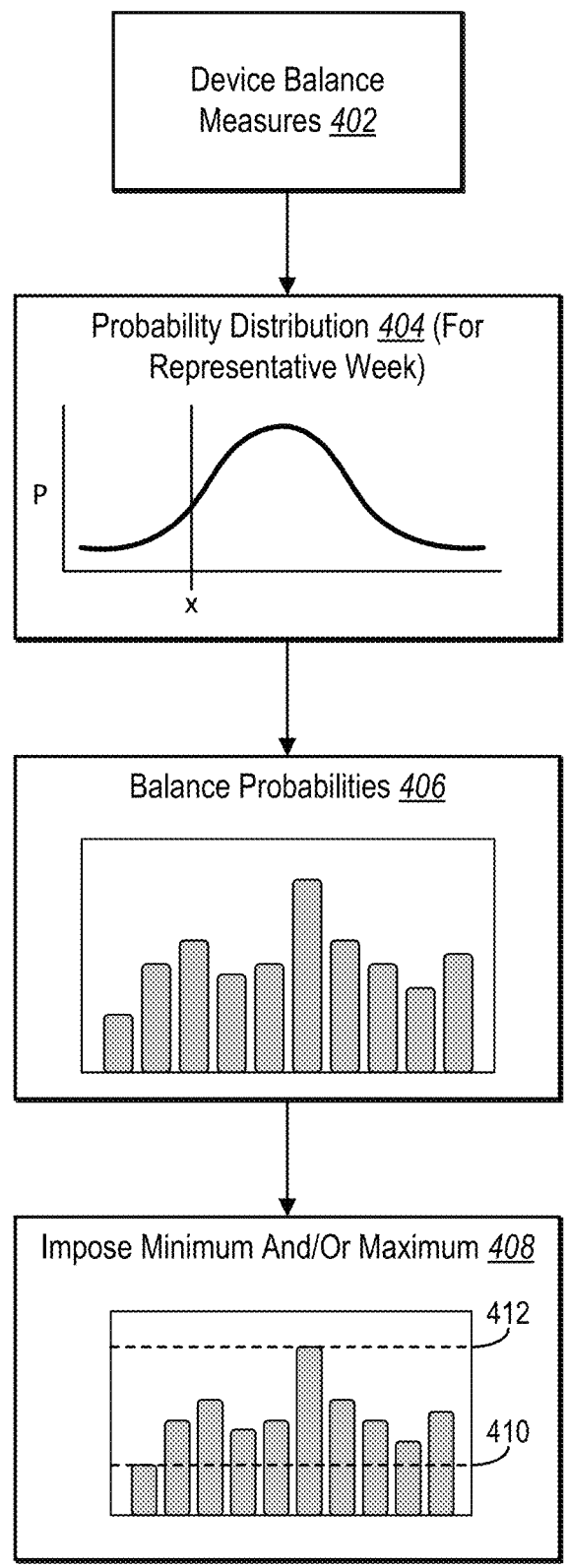
FIG. 4 illustrates utilizing a probability distribution to generate probabilities in accordance with one or more embodiments.

As mentioned above, in some embodiments, the provider balance system 116 can apply thresholds to device utilization ratios to further smooth provider device balance graphs. For example, the provider balance system 116 can apply a lower probability distribution device balance threshold and/or an upper probability distribution device balance threshold. FIG. 4 provides additional detail regarding a process for determining probabilities and applying minimum or maximum thresholds in accordance with one or more embodiments.

For example, as shown in FIG. 4, the provider balance system 116 can utilize the device utilization ratios 402 and a probability distribution 404 for a representative week (or other representative time period) to determine the probabilities 406. More specifically, the provider balance system 116 can determine a probability 406 corresponding to a particular device utilization ratio by determining the inverse cumulative probability (from the probability distribution) for the device utilization ratios 402 that device utilization ratio.

The provider balance system 116 can determine a probability distribution based on historical or forecasted measures. For example, the provider balance system 116 can determine a probability distribution by analyzing historical device utilization ratios from a representative time period (e.g., a "normal" or "average" week or month). In some embodiments, the provider balance system 116 can determine forecast measures for a time period (e.g., a week) and generate a probability distribution based on the forecast measures (e.g., determine a mean and standard deviation of the forecast measures).

As mentioned, the provider balance system 116 can utilize various approaches to determine probabilities 406. For example, the provider balance system 116 can rank and bin device utilization ratios 402 by percentile to generate probabilities 406. In one or more embodiments, the provider balance system 116 determines a percentile for each of the device utilization ratios 402 and assigns the device utilization ratios 402 to bins based on their percentile rank. In one or more embodiments, the provider balance system 116 can utilize the binned values as the probabilities 406.

Further, in one or more embodiments, the provider balance system 116 generates probabilities 406 based on a cumulative distribution. In particular, the provider balance system 116 can generate an inverse cumulative probability distribution and utilize the inverse cumulative probability distribution to generate the probabilities 406. That is, the provider balance system 116 can determine probabilities 406 by determining from the inverse cumulative probability distribution that a random value takes a value less than or equal to the corresponding device utilization ratios 402.

As mentioned, in one or more embodiments, the provider balance system 116 can utilize an inverse cumulative probability distribution to map device utilization ratios to corresponding probability bins. To illustrate, the provider balance system 116 can utilize an inverse cumulative probability distribution to identify ranges of device utilization ratios that corresponding to inverse cumulative distribution ranges. The provider balance system 116 can then bin the device utilization ratios 402 according to each of the determined probability ranges and utilize those binned values as the probabilities 406.

As shown in FIG. 4, the provider balance system 116 can also perform an act 408 of imposing minimum and/or maximum thresholds on the probabilities 406. That is, upon generating the probabilities 406, the provider balance system 116 can impose thresholds before generating the provider device balance graph. For example, as illustrated in FIG. 4, the provider balance system 116 can impose a lower device balance threshold 410 and an upper device balance threshold 412. The provider balance system 116 can map values that fall below the lower device balance threshold 410 to values at or above the lower device balance threshold 410. Similarly, the provider balance system 116 can map values that fall above the upper device balance threshold 412 to at or below the upper device balance threshold 412.

In some embodiments, the provider balance system 116 can map the largest value (e.g., the largest probabilities) to the upper device balance threshold 412. In particular, the provider balance system 116 can require the largest value to the upper device balance threshold (and redistribute the remaining values) to more clearly articulate differences between measures shown on the graph To illustrate, in some embodiments, the provider balance system 116 imposes a lower device balance threshold of 10 and an upper device balance threshold of 100. The provider balance system 116 can then distribute (or normalize) probabilities between the lower device balance threshold and the upper device balance threshold. For example, the provider balance system 116 can multiply each probabilities 406 by 0.9 and add 10. However, it will be appreciated that the provider balance system 116 can adjust the probabilities within a variety of selected ranges.

As discussed above, in one or more embodiments, the provider balance system 116 can determine probabilities 406 based on a binning procedure and/or can bin probabilities 406 before generating the provider device balance graph. FIG. 5 illustrates a binning procedure for probabilities in accordance with one or more embodiments.

Specifically, as shown in FIG. 5, the provider balance system 116 can rank the probabilities and can map each probabilities onto a bin and corresponding bin value based on its bin range. Specifically, upon ranking the probabilities, the provider balance system 116 can determine a probability distribution. For example, in relation to FIG. 5, the provider balance system 116 determines that the top two measures (4.8, 5.1 reflecting the top 10% of values) corresponding to a first bin (e.g., labeled 100) corresponding to an inverse cumulative probability range of 91-100%. Similarly, the provider balance system 116 determines that the next two measures (3.2, 4.45) correspond to a second bin (e.g., labeled 90) corresponding to an inverse cumulative probability range of 81%-90%.

As shown, the provider balance system 116 can also assign measures to bins based on a bin range. Although FIG. 5 shows the bin ranges corresponds to the probability distribution device measures as ranked, in some embodiments, the bin ranges are determined separately from the ranked device utilization ratios. For example, the provider balance system 116 can determine a probability distribution based on historical values and determine bin ranges based on the probability distribution. For instance, the provider balance system 116 can determine that a 91% inverse cumulative probability corresponds to a first value and use the first value to define the lower range for the first bin (labeled "100"). Similarly, the provider balance system 116 can determine that an 81% inverse cumulative probability corresponds to a second value and that a 90% inverse cumulative probability corresponds to a third value. The provider balance system 116 can determine a range for the second bin utilizing the second value and the third value. More specifically, the provider balance system 116 can utilize the second value as the lower range for the second bin (labeled "90") and the third value as the upper range for the second bin.

Thus, the provider balance system 116 can determine a number of bins and can assign a value to probabilities assigned to that bin. Further, the provider balance system 116 can determine a range of probabilities for each bin based on a probability distribution (e.g., based on an inverse cumulative distribution as discussed above). Then, the provider balance system 116 can utilize the bin values to visualize the probabilities 406 in the provider device balance graph. Accordingly, in relation to FIG. 5, the provider balance system 116 maps the device utilization ratio 5.1 to a probability of 100. Similarly, the provider balance system 116 maps the device utilization ratio 0.8 to a probability of 20.

Figure 6:
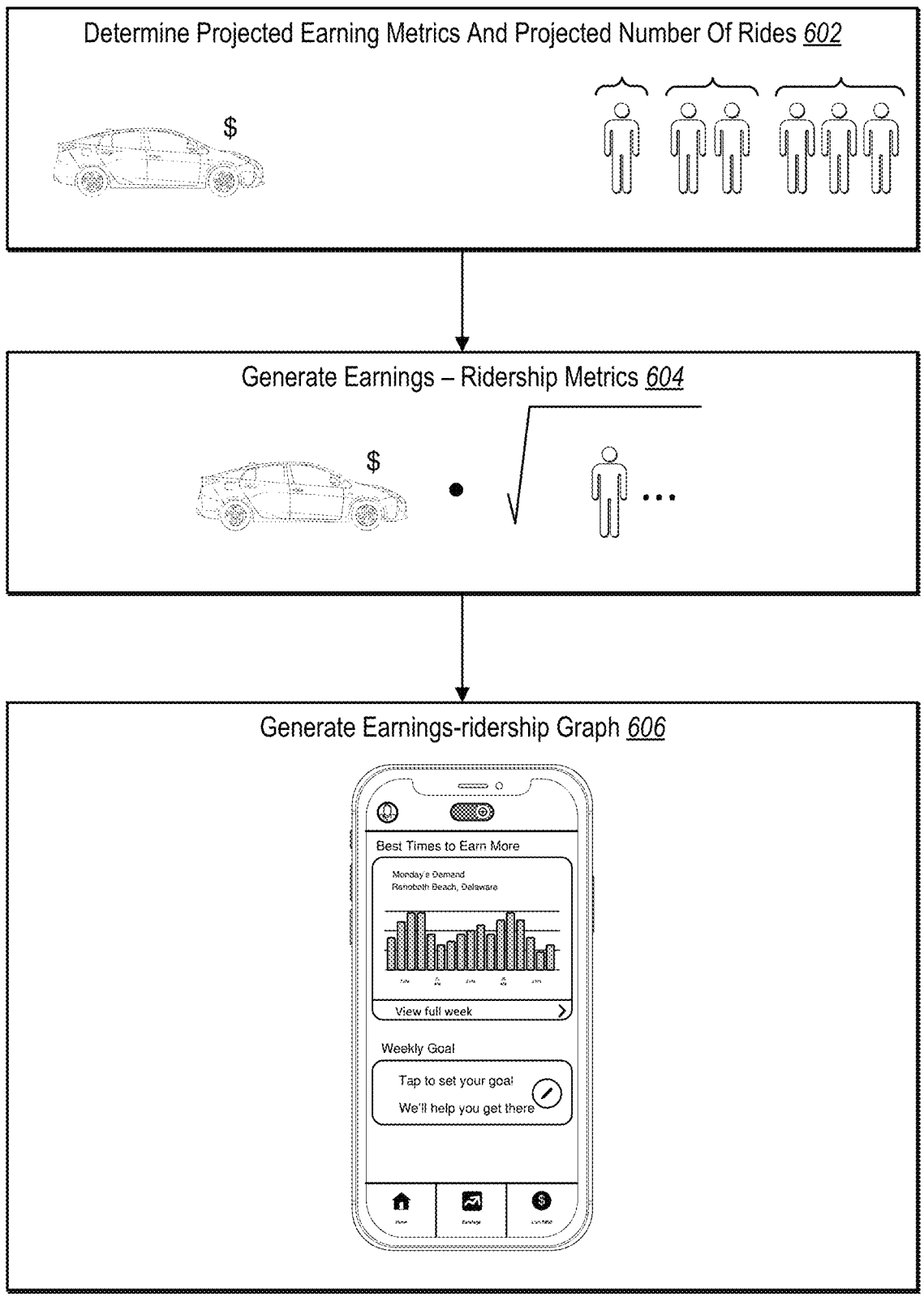
FIG. 6 illustrates generating and utilizing an earnings-ridership metric for a provider balance system in accordance with one or more embodiments.

As also discussed briefly above, the provider balance system 116 can generate and utilize earnings-ridership metrics to utilize in an earnings-ridership graph within a provider incentive graphical user interface. FIG. 6 illustrates generating and utilizing an earnings-ridership metric. For example, as shown in FIG. 6, the provider balance system 116 performs an act 602 of determining projected earning metrics and projected number of rides. Similar to the discussion above with regard to forecast measures, the provider balance system 116 can generate the projected earning metrics and projected number of rides based on data monitored from the requester device(s) 102 and the provider device(s) 106. The provider balance system 116 can also receive the projected earning metrics and projected number of rides from the transportation matching system 114 and/or from another source via the network 110.

Further, as shown in FIG. 6, the provider balance system 116 can perform an act 604 of generating an earnings-ridership metric. The provider balance system 116 can generate the earnings-ridership metric based on the projected earning metrics and the projected number of rides for a specified time period. More specifically, in one or more embodiments, the provider balance system 116 generates the earnings-ridership metric by multiplying the projected earning metrics for a given time period and a radical of the projected number of rides for the given time period. The provider balance system 116 can utilize a projected earnings metric per ride and/or per time interval. For example, the provider balance system 116 can utilize the square root or the cube root of the number of projected rides to determine the earnings-ridership metric.

Then, the provider balance system 116 can perform an act 606 of generating a driver device incentive graph that reflects the earnings-ridership metrics. In particular, the provider balance system 116 can generate a driver device incentive graph with a visual representation for individual earning-ridership metrics for individual times within a target time period. As discussed above (in relation to FIG. 4), the provider balance system 116 can apply thresholds to the earning-ridership metrics and/or determine probability distribution earning-ridership metrics. The earnings-ridership graph can accurately communicate relative benefit of driving at various times by utilizing both earnings and ride frequency rather than raw demand.

Figure 7:
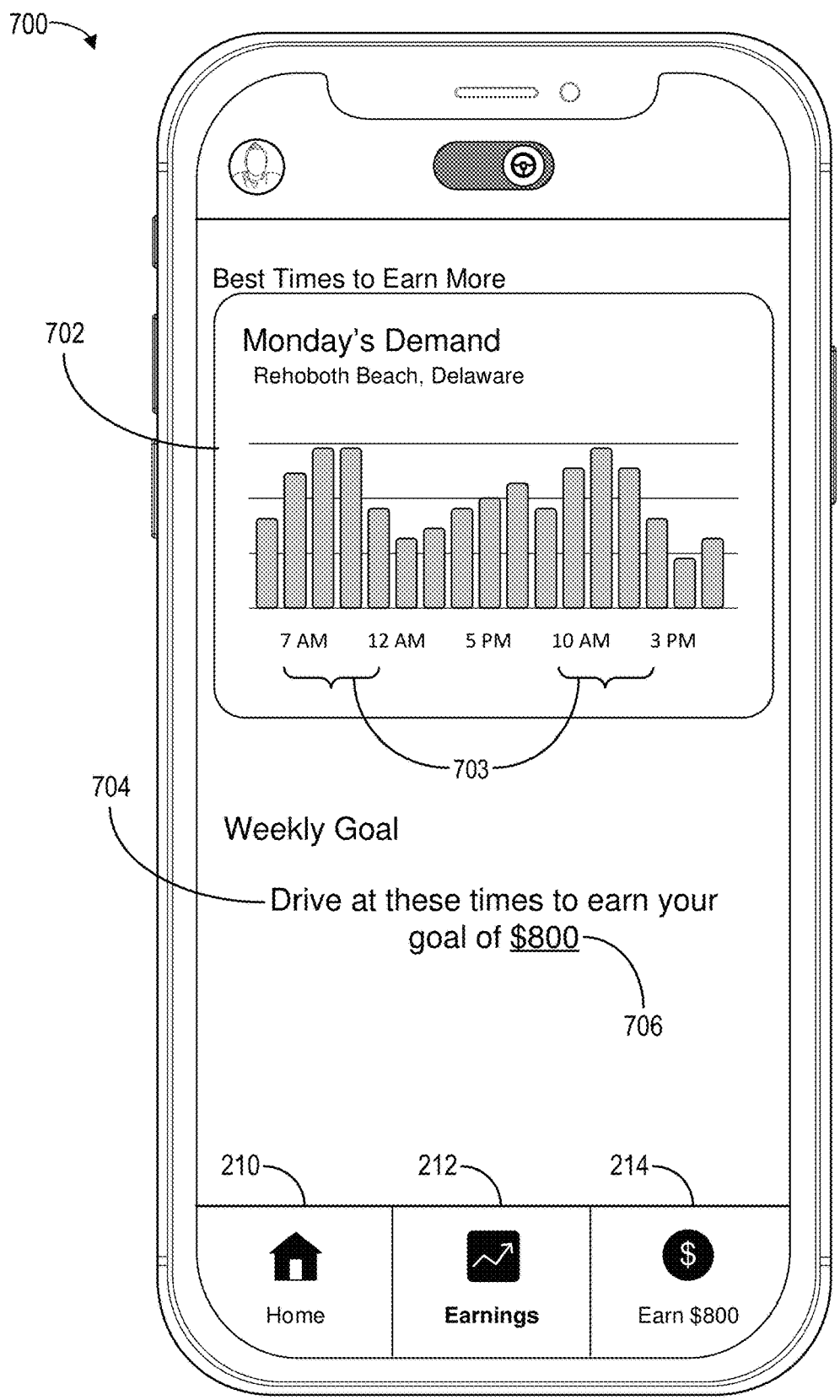
FIG. 7 illustrates a provider scheduling graphical user interface in accordance with one or more embodiments.

As discussed briefly above, the provider balance system 116 can present a scheduling graphical user interface including a provider device balance graph to communicate to provider device(s). FIG. 7 shows an example embodiment of a scheduling graphical user interface presented in accordance with one or more embodiments.

As shown in FIG. 7, the scheduling graphical user interface 700 can include a provider device balance graph 702. In one or more embodiments, the provider device balance graph 702 that includes scheduling indicators 703. The scheduling indicators 703 identify suggested time periods for providing transportation services.

As illustrated, in some embodiments, the provider balance system 116 can generate the scheduling indicators 703 based on a particular goal for the provider device. For instance, the provider balance system 116 can suggest a schedule to satisfy a monetary goal or other goals (e.g., a goal for a number of rides or a goal for an amount of time spent driving). For example, as shown in FIG. 7, the scheduling indicators 703 bracket two time periods at which the driver can drive during the visualized day in order to meet a weekly goal. However, the provider balance system 116 can present the scheduling indicators 703 in accordance with a variety of designs that communicate selected time periods. For example, the scheduling indicators 703 can be highlighted portions of the provider device balance graph, portions of the provider device balance graph with an alternate color, a circled or boxed portion of the provider device balance graph, or any other indication of a selected portion. In some embodiments, the provider balance system 116 can suggest a transportation schedule utilizing a variety of different interface elements (e.g., by providing a calendar with drive times highlighted).

The provider balance system 116 can generate suggested schedules based on a variety of factors. In some embodiments, the provider balance system 116 generates suggestions based on the highest device utilization ratios (or highest probabilities). In some embodiments, the provider balance system 116 suggests transportation times with the highest device utilization ratios until satisfying a particular goal. For instance, in relation to FIG. 7, the provider balance system 116 generates suggested transportation times until projected earnings during the suggested times exceed $800.

In one or more embodiments, the provider balance system 116 can generate a suggested schedule based on preferred or historical transportation times of the provider device (e.g., emphasize night times for a provider device that is typically available at nights). Similarly, the provider balance system 116 can generate a schedule based on a minimum consecutive drive time (e.g., group drive times into a minimum of two hour drive times).

The provider balance system 116 can utilize heuristic approaches to generate suggested schedules. In some embodiments, the provider balance system 116 can utilize a machine learning model to generate suggested schedules. For instance, the provider balance system 116 can utilize a neural network (e.g., a recurrent neural network) to analyze input parameters (e.g., goals, historical drive times, etc.), and generate suggested drive times.

Although FIG. 7 illustrates suggestions for particular times, the provider balance system 116 can also generate suggestions for particular locations. For instance, the provider balance system 116 can analyze device utilization ratios for a plurality of locations and suggest a location based on the device utilization ratios (e.g., suggest the locations and times with the highest device utilization ratios).

Further, as shown in FIG. 7, the scheduling graphical user interface 700 can include a scheduling explanation 704. The scheduling explanation 704 can display the goal corresponding to the provider device 106 and the duration of the goal. For example, as shown in FIG. 7, the scheduling explanation 704 indicates that the goal is a "Weekly Goal" and recites "Drive at these time to earn your goal of $800." As also shown in FIG. 7, the scheduling explanation 704 can include the goal input area 706. The goal input area 706 can receive provider input indicating the provider's target earnings. In response to receiving input at the goal input area 706, the provider balance system 116 can generate and/or update the placement of the scheduling indicators 703 to reflect the provided goal.

Though FIG. 7 shows a weekly goal and a day view of a provider device balance graph, it will be appreciated that the scheduling graphical user interface 700 can present provider device balance graphs and scheduling indicators 703 corresponding to a variety of goals and goal durations. For example, the scheduling graphical user interface 700 can include daily, monthly, or yearly goals. Additionally, the scheduling graphical user interface 700 can include provider device balance graphs visualizing relative supply and demand over various time periods, including a week or month.

Figure 8:
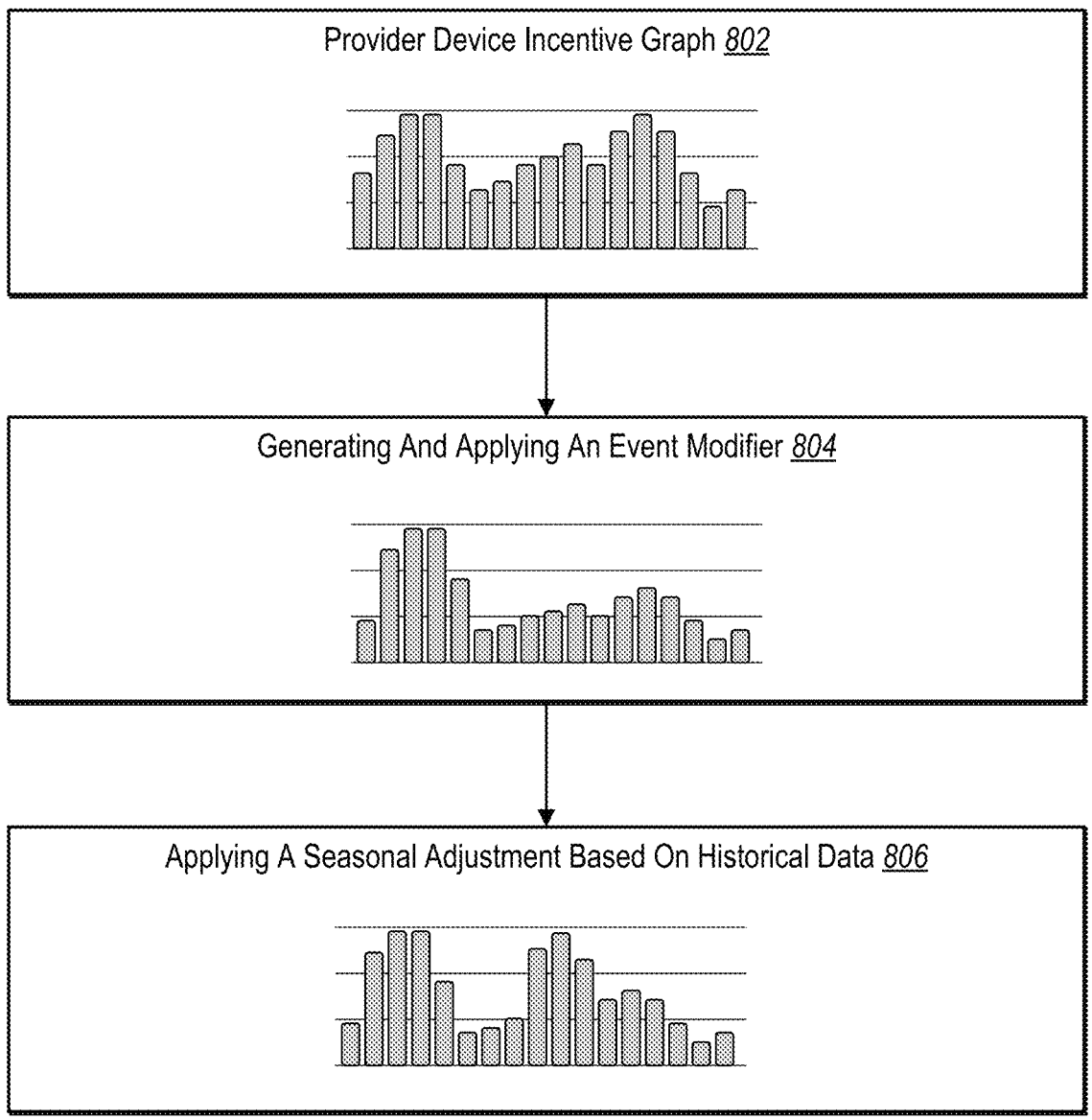
FIG. 8 illustrates applying event and seasonal adjustments to provider incentive graphs in accordance with one or more embodiments.

Additionally, as briefly mentioned above, the provider balance system 116 can apply event modifiers and/or seasonal scaling. FIG. 8 illustrates applying these adjustments to an example provider device balance graph. First, as shown in FIG. 8, the provider balance system 116 can start with a generated provider device balance graph 802.

Then, as also shown in FIG. 8, the provider balance system 116 can perform an act 804 of generating and applying an event modifier. The provider balance system 116 can generate the event modifier based on historical data and/or data received from the transportation matching system 114 and/or via the network 110. That is, the provider balance system 116 can utilize both historical data from a variety of sources and data regarding an upcoming event received from an administrator or from another source. Then, based on the event data, including based on data from similar events, the provider balance system 116 can generate an event modifier for a provider device balance graph 802. Then, the provider balance system 116 can apply the event modifier to the relevant portions (i.e. times) on the provider device balance graph 802.

For example, the provider balance system 116 can analyze historical data and determine that a professional basketball game increases device utilization ratios by a factor of 1.4 (on average). The provider balance system 116 can analyze a repository of upcoming events and identify that a professional basketball is scheduled. The provider balance system 116 can the apply the event modifier (e.g., 1.4) to the device utilization ratios.

The provider balance system 116 can apply scaling metrics to a variety of time periods. For example, the provider balance system 116 can perform scaling on a per day or per week basis. Thus, for instance, the provider balance system 116 can apply a Christmas Day event scaling metric to an entire day or a basketball event scaling metric to a particular hour.

Additionally, as shown in FIG. 8, the provider balance system 116 can perform an act 806 of applying a seasonal adjustment based on historical data. As discussed above, the provider balance system 116 can determine historical data via requester device(s) 102 and provider device(s) 106, via the transportation matching system 114, and/or from other sources via the network 110. The provider balance system 116 can determine a seasonal adjustment for a provider device balance graph 802 based on the time of year applicable to the graph. For example, the provider balance system 116 can determine that a geographical area around a university experiences increased requests on weekdays in the afternoon during the school year, but not during summer break. That is, the provider balance system 116 can determine that during the season applicable to a provider device balance graph 802, the transportation matching system 114 experiences increased demand during a particular time of day and can scale the provider device balance graph 802 accordingly.

In addition to event or seasonal scaling, the provider balance system 116 can also apply other scaling metrics. For example, the provider balance system 116 can apply geographic scaling metrics. To illustrate, the provider balance system 116 can apply a particular scaling metric (e.g., a 2.0 multiplier) to a first geographic location relative to a second geographic location.

Figure 9:
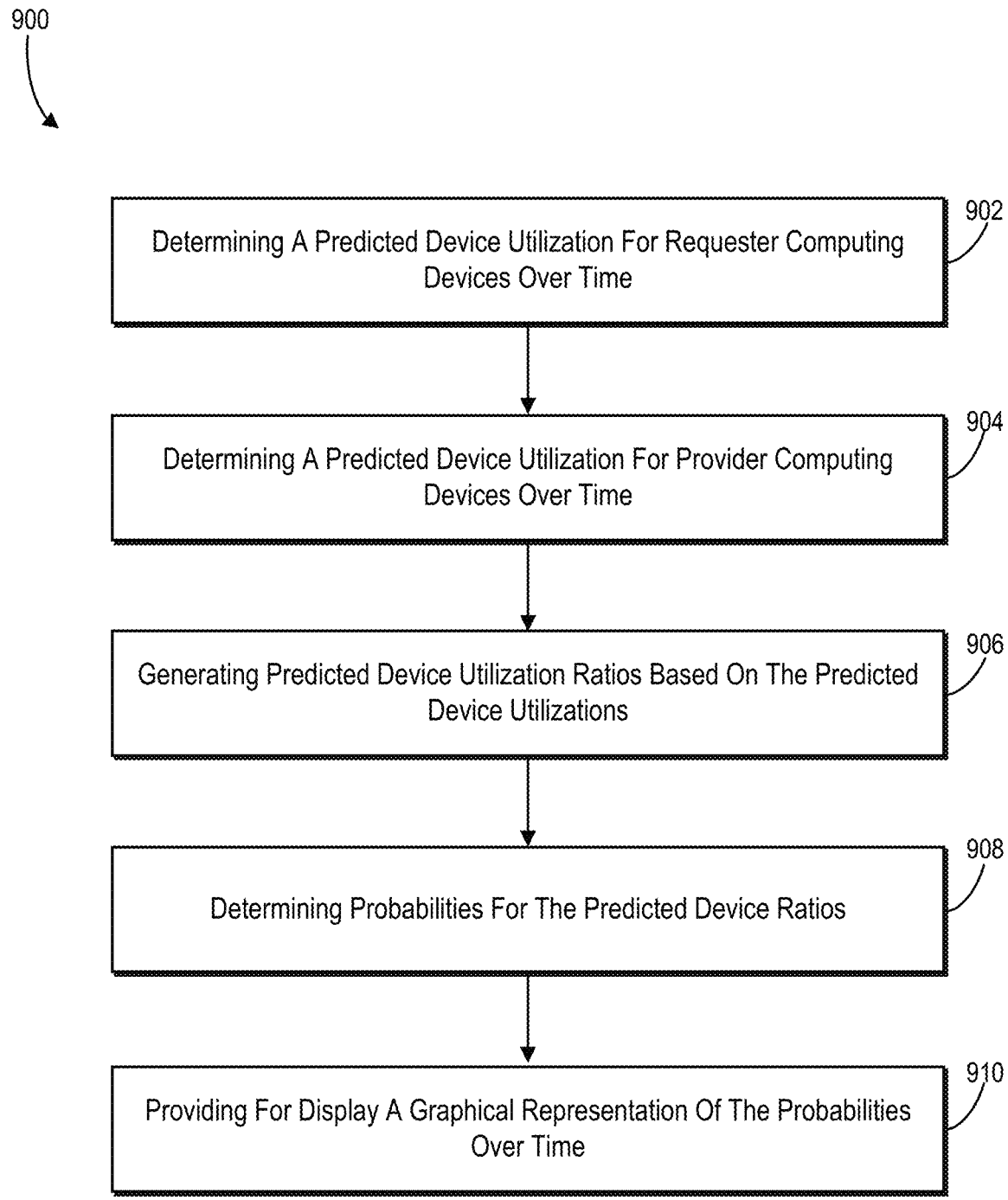
FIG. 9 illustrates a flowchart of a series of acts for a provider balance system in accordance with one or more embodiments.

FIGS. 1-8, the corresponding text, and the examples provide a number of different methods, systems, devices, and non-transitory computer-readable media of the provider balance system 116. In addition to the foregoing, one or more embodiments can also be described in terms of flowcharts comprising acts for accomplishing a particular result, as shown in FIG. 9. FIG. 9 may be performed with more or fewer acts. Further, the acts may be performed in differing orders. Additionally, the acts described herein may be repeated or performed in parallel with one another or parallel with different instances of the same or similar acts.

As mentioned, FIG. 9 illustrates a flowchart of a series of acts 900 for the provider balance system 116 in accordance with one or more embodiments. While FIG. 9 illustrates acts according to one embodiment, alternative embodiments may omit, add to, reorder, and/or modify any of the acts shown in FIG. 9. The acts of FIG. 9 can be performed as part of a method. Alternatively, a non-transitory computer-readable medium can comprise instructions that, when executed by one or more processors, cause a computing device to perform the acts of FIG. 9. In some embodiments, a system can perform the acts of FIG. 9.

As shown in FIG. 9, the series of acts 900 includes an act 902 for determining a forecast measure for requester computing devices within a time period. In particular, the act 902 can include determining a forecast measure of requester computing device application sessions for a plurality of requester computing devices of a transportation matching system for a plurality of times within a time period.

Additionally, as shown in FIG. 9, the series of acts 900 includes an act 904 for determining a forecast measure of provider computing device availability for a plurality of provider computing devices within the time period. In particular, the act 904 can include determining a forecast measure of provider computing device availability for a plurality of provider computing devices of the transportation matching system for the plurality of times within the time period.

Further, as shown in FIG. 9, the series of acts 900 includes an act 906 for based on the forecast measure of requester computing device application sessions and the forecast measure of provider computing device availability, generating device utilization ratios. In particular, the act 906 can include, based on the forecast measure of requester computing device application sessions and the forecast measure of provider computing device availability, generating device utilization ratios for the plurality of times within the time period. In one or more embodiments, the act 906 can include generating projected provider device earnings-ridership metrics for the plurality of times based on projected provider device earnings metrics for the plurality of times and a radical of a projected number of rides for the plurality of times.

The series of acts 900 also includes an act 908 for generating probabilities from the device utilization ratios based on cumulative probabilities of the market balance measures. In particular, the act 908 can include generating probabilities from the device utilization ratios based on cumulative probabilities of the market balance measures. Specifically, the act 908 can include determining ratios of the forecast measures of provider computing device application sessions to the forecast measure of provider computing device availability measures. Further, the act 908 can include organizing the device utilization ratios for the plurality of times into a plurality of bins based on the cumulative probabilities, wherein the plurality of bins reflect cumulative probability ranges.

Additionally, the act 908 can include determining a lower probability distribution device balance threshold and generating the probabilities by mapping the device utilization ratios above the lower probability distribution device balance threshold. The act 908 can also include identifying a standardized probability distribution device balance distribution based on historical provider computing device availability and historical requester computing device application sessions for a test time period and determining the cumulative probabilities of the market balance measures based on the standardized probability distribution device balance distribution.

As shown in FIG. 9, the series of acts 900 further includes an act 910 for providing a provider device balance graph portraying the probability distribution device balance metrics with respect to the time period. In particular, the act 910 can include providing, for display via a provider computing device, a provider device balance graph portraying the probability distribution device balance metrics with respect to the plurality of times. Specifically, the act 910 can include displaying visual representations of the plurality of bins with respect to the plurality of time. In one or more embodiments, the act 908 can include generating one or more provider device balance graphs portraying the provider device earnings-ridership metrics with respect to the plurality of times. Further, the act 908 can include identifying an event corresponding to a time range within the time period, determining an event modifier corresponding to the event, identifying a set of probabilities corresponding to the time range from the probabilities, and adjusting the set of probabilities corresponding to the time range utilizing the event modifier.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 10:
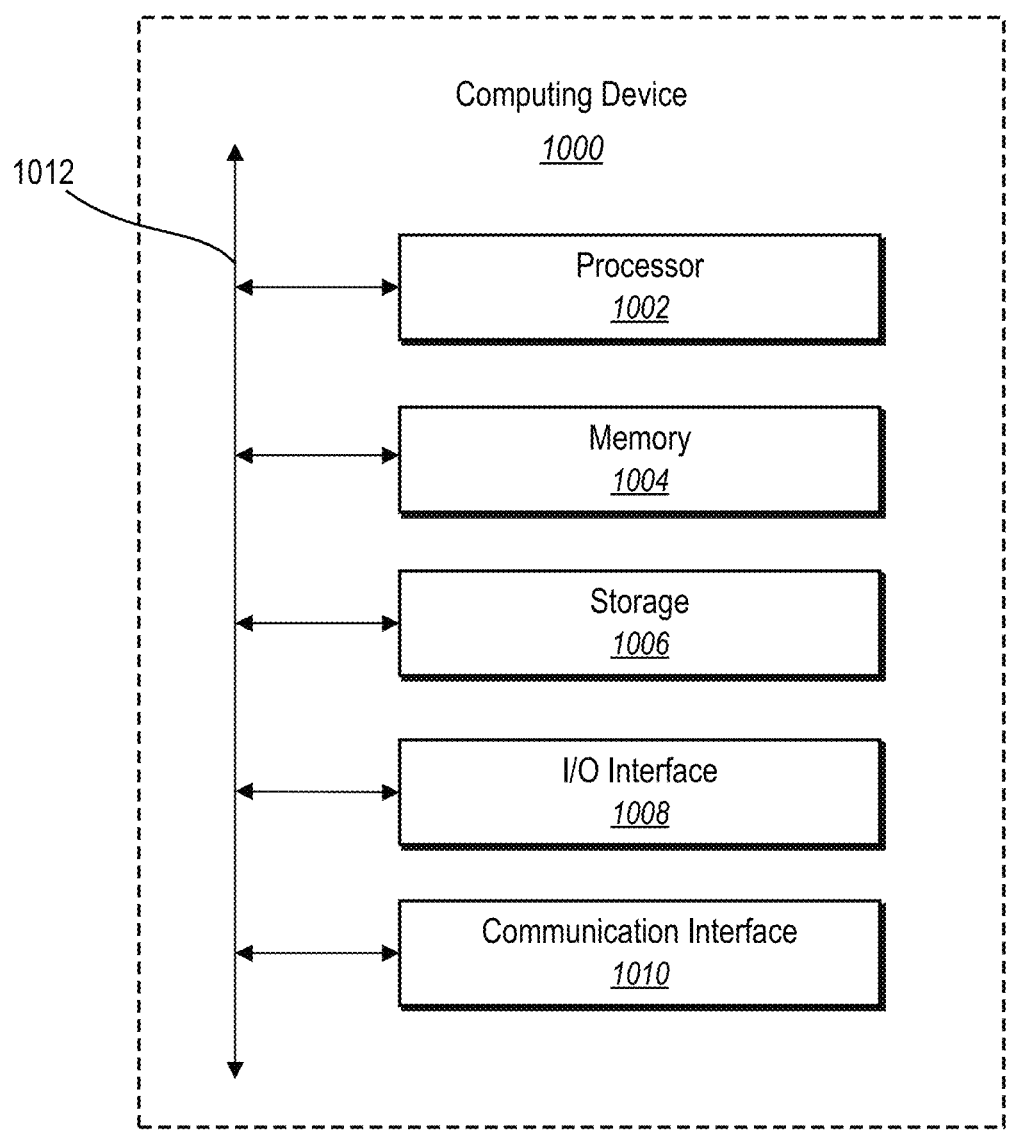
FIG. 10 illustrates a block diagram of an example computing device for implementing one or more embodiments of the present disclosure.

FIG. 10 illustrates a block diagram of an example computing device 1000 that may be configured to perform one or more of the processes described above. One will appreciate that one or more computing devices, such as the computing device 1000 may represent the computing devices described above (e.g., computing requester device(s) 102, provider device(s) 106, and/or server device(s) 112). In one or more embodiments, the computing device 1000 may be a mobile device (e.g., a mobile telephone, a smartphone, a PDA, a tablet, a laptop, a camera, a tracker, a watch, a wearable device, etc.). In some embodiments, the computing device 1000 may be a non-mobile device (e.g., a desktop computer or another type of client device). Further, the computing device 1000 may be a server device that includes cloud-based processing and storage capabilities.

As shown in FIG. 10, the computing device 1000 can include one or more processor(s) 1002, memory 1004, a storage device 1006, input/output interfaces 1008 (or "I/O interfaces 1008"), and a communication interface 1010, which may be communicatively coupled by way of a communication infrastructure (e.g., bus 1012). While the computing device 1000 is shown in FIG. 10, the components illustrated in FIG. 10 are not intended to be limiting. Additional or alternative components may be used in other embodiments. Furthermore, in certain embodiments, the computing device 1000 includes fewer components than those shown in FIG. 10. Components of the computing device 1000 shown in FIG. 10 will now be described in additional detail.

In particular embodiments, the processor(s) 1002 includes hardware for executing instructions, such as those making up a computer program. As an example, and not by way of limitation, to execute instructions, the processor(s) 1002 may retrieve (or fetch) the instructions from an internal register, an internal cache, memory 1004, or a storage device 1006 and decode and execute them.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1004 may be internal or distributed memory.

The computing device 1000 includes a storage device 1006 includes storage for storing data or instructions. As an example, and not by way of limitation, the storage device 1006 can include a non-transitory storage medium described above. The storage device 1006 may include a hard disk drive (HDD), flash memory, a Universal Serial Bus (USB) drive or a combination these or other storage devices.

As shown, the computing device 1000 includes one or more I/O interfaces 1008, which are provided to allow a user to provide input to (such as user strokes), receive output from, and otherwise transfer data to and from the computing device 1000. These I/O interfaces 1008 may include a mouse, keypad or a keyboard, a touch screen, camera, optical scanner, network interface, modem, other known I/O devices or a combination of such I/O interfaces 1008. The touch screen may be activated with a stylus or a finger.

The I/O interfaces 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1008 are configured to provide graphical data to a display for presentation to a user. The graphical data may be representative of one or more graphical user interfaces and/or any other graphical content as may serve a particular implementation.

The computing device 1000 can further include a communication interface 1010. The communication interface 1010 can include hardware, software, or both. The communication interface 1010 provides one or more interfaces for communication (such as, for example, packet-based communication) between the computing device and one or more other computing devices or one or more networks. As an example, and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI. The computing device 1000 can further include a bus 1012. The bus 1012 can include hardware, software, or both that connects components of computing device 1000 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

Figure 11:
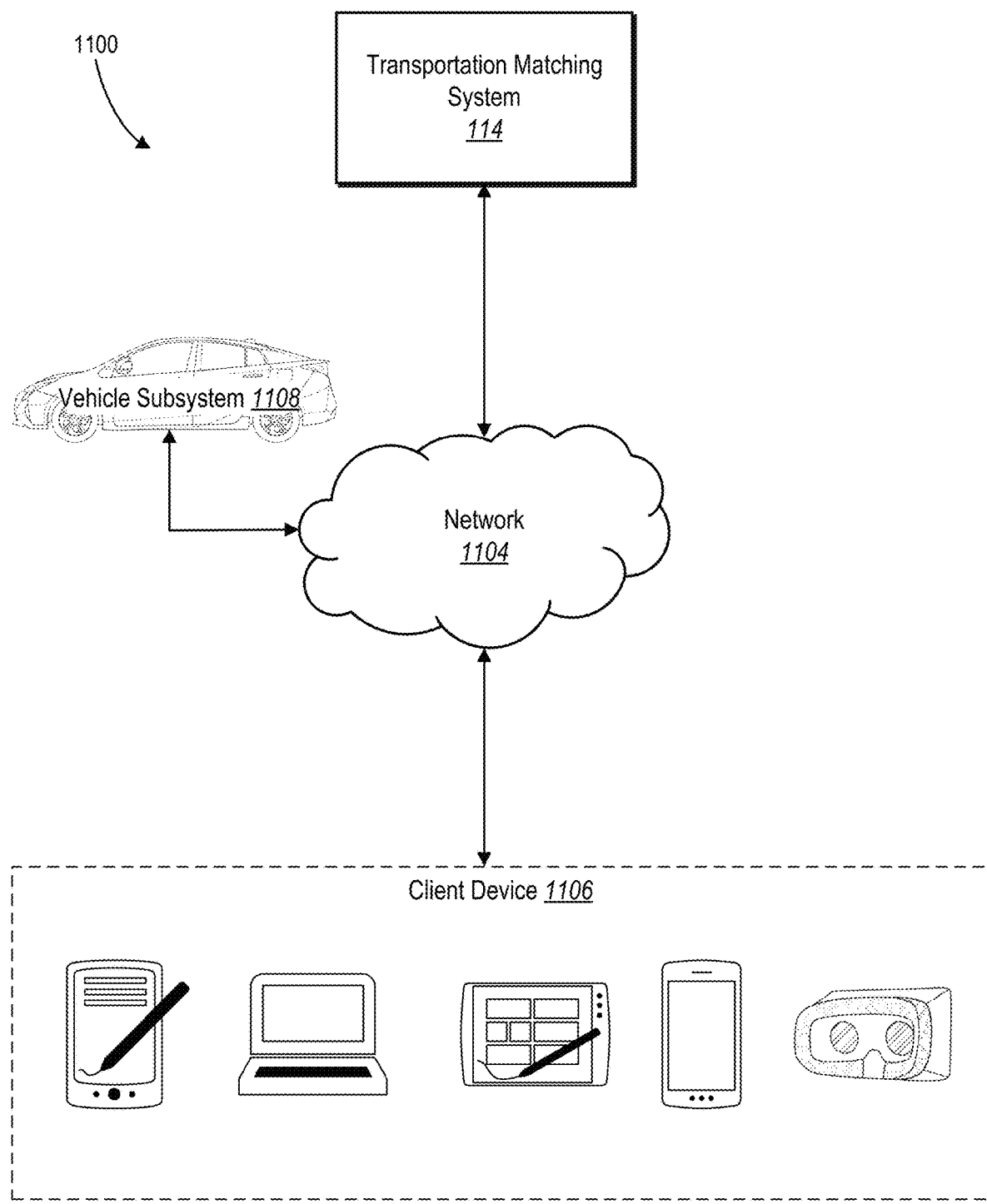
FIG. 11 illustrates a block diagram of an example transportation matching system in accordance with one or more embodiments.

FIG. 11 illustrates an example network environment 1100 of a transportation matching system (e.g., the transportation matching system 114). The network environment 1100 includes a client device 1106, a transportation matching system 114, and a vehicle subsystem 1108 connected to each other by a network 1104. Although FIG. 11 illustrates a particular arrangement of the client device 1106, the transportation matching system 114, the vehicle subsystem 1108, and the network 1104, this disclosure contemplates any suitable arrangement of the client device 1106, the transportation matching system 114, the vehicle subsystem 1108, and the network 1104. As an example, and not by way of limitation, two or more of the client device 1106, the transportation matching system 114, and the vehicle subsystem 1108 communicate directly, bypassing the network 1104. As another example, two or more of the client device 1106, the transportation matching system 114, and the vehicle subsystem 1108 may be physically or logically co-located with each other in whole or in part. Moreover, although FIG. 11 illustrates a particular number of the client devices 1106, the transportation matching systems 114, the vehicle subsystems 1108, and the networks 1104, this disclosure contemplates any suitable number of the client devices 1106, the transportation matching systems 114, the vehicle subsystems 1108, and the networks 1104. As an example, and not by way of limitation, the network environment 1100 may include multiple client devices 1106, the transportation matching systems 114, the vehicle subsystems 1108, and the networks 1104.

This disclosure contemplates any suitable network 1104. As an example, and not by way of limitation, one or more portions of the network 1104 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. The network 1104 may include one or more networks 1104.

Links may connect the client device 1106, the transportation matching system 114, and the vehicle subsystem 1108 to the communication network 1104 or to each other. This disclosure contemplates any suitable links. In particular embodiments, one or more links include one or more wireline (such as for example Digital Subscriber Line (DSL) or Data Over Cable Service Interface Specification (DOCSIS), wireless (such as for example Wi-Fi or Worldwide Interoperability for Microwave Access (WiMAX), or optical (such as for example Synchronous Optical Network (SONET) or Synchronous Digital Hierarchy (SDH) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout the network environment 1100. One or more first links may differ in one or more respects from one or more second links.

In particular embodiments, the client device 1106 may be an electronic device including hardware, software, or embedded logic components or a combination of two or more such components and capable of carrying out the appropriate functionalities implemented or supported by the client device 1106. As an example, and not by way of limitation, a client device 1106 may include any of the computing devices discussed above in relation to FIG. 7. A client device 1106 may enable a network user at the client device 1106 to access a network. A client device 1106 may enable its user to communicate with other users at other client systems 1106.

In particular embodiments, the client device 1106 may include a transportation service application or a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at the client device 1106 may enter a Uniform Resource Locator (URL) or other address directing the web browser to a particular server (such as server), and the web browser may generate a Hyper Text Transfer Protocol (HTTP) request and communicate the HTTP request to server. The server may accept the HTTP request and communicate to client device 1106 one or more Hyper Text Markup Language (HTML) files responsive to the HTTP request. The client device 1106 may render a webpage based on the HTML files from the server for presentation to the user. This disclosure contemplates any suitable webpage files. As an example, and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, the transportation matching system 114 may be a network-addressable computing system that can host a ride share transportation network. The transportation matching system 114 may generate, store, receive, and send data, such as, for example, user-profile data, concept-profile data, text data, ride request data, GPS location data, provider data, requester data, vehicle data, or other suitable data related to the ride share transportation network. This may include authenticating the identity of providers and/or vehicles who are authorized to provide ride services through the transportation matching system 114. In addition, the transportation service system may manage identities of service requestors such as users/requesters. In particular, the transportation service system may maintain requester data such as driving/riding histories, personal data, or other user data in addition to navigation and/or traffic management services or other location services (e.g., GPS services).

In particular embodiments, the transportation matching system 114 may manage ride matching services to connect a user/requester with a vehicle and/or provider. By managing the ride matching services, the transportation matching system 114 can manage the distribution and allocation of vehicle subsystem resources and user resources such as GPS location and availability indicators, as described herein.

The transportation matching system 114 may be accessed by the other components of the network environment 1100 either directly or via network 1104. In particular embodiments, the transportation matching system 114 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, the transportation matching system 114 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client device 1106, or a transportation matching system 114 to manage, retrieve, modify, add, or delete, the information stored in data store.

In particular embodiments, the transportation matching system 114 may provide users with the ability to take actions on various types of items or objects, supported by the transportation matching system 114. As an example, and not by way of limitation, the items and objects may include ride share networks to which users of the transportation matching system 114 may belong, vehicles that users may request, location designators, computer-based applications that a user may use, transactions that allow users to buy or sell items via the service, interactions with advertisements that a user may perform, or other suitable items or objects. A user may interact with anything that is capable of being represented in the transportation matching system 114 or by an external system of a third-party system, which is separate from the transportation matching system 114 and coupled to the transportation matching system 114 via a network 1104.

In particular embodiments, the transportation matching system 114 may be capable of linking a variety of entities. As an example, and not by way of limitation, the transportation matching system 114 may enable users to interact with each other or other entities, or to allow users to interact with these entities through an application programming interfaces (API) or other communication channels.

In particular embodiments, the transportation matching system 114 may include a variety of servers, sub-systems, programs, modules, logs, and data stores. In particular embodiments, the transportation matching system 114 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The transportation matching system 114 may also include suitable components such as network interfaces, security mechanisms, load balancers, failover servers, management-and-network-operations consoles, other suitable components, or any suitable combination thereof. In particular embodiments, the transportation matching system 114 may include one or more user-profile stores for storing user profiles. A user profile may include, for example, biographic information, demographic information, behavioral information, social information, or other types of descriptive information, such as work experience, educational history, hobbies or preferences, interests, affinities, or location.

The web server may include a mail server or other messaging functionality for receiving and routing messages between the transportation matching system 114 and one or more client systems 1106. An action logger may be used to receive communications from a web server about a user's actions on or off the transportation matching system 114. In conjunction with the action log, a third-party-content-object log may be maintained of user exposures to third-party-content objects. A notification controller may provide information regarding content objects to a client device 1106. Information may be pushed to a client device 1106 as notifications, or information may be pulled from the client device 1106 responsive to a request received from the client device 1106. Authorization servers may be used to enforce one or more privacy settings of the users of the transportation matching system 114. A privacy setting of a user determines how particular information associated with a user can be shared. The authorization server may allow users to opt in to or opt out of having their actions logged by the transportation matching system 114 or shared with other systems, such as, for example, by setting appropriate privacy settings. Third-party-content-object stores may be used to store content objects received from third parties. Location stores may be used for storing location information received from the client systems 1106 associated with users.

In addition, the vehicle subsystem 1108 can include a human-operated vehicle or an autonomous vehicle. A provider of a human-operated vehicle can perform maneuvers to pick up, transport, and drop off one or more requesters according to the embodiments described herein. In certain embodiments, the vehicle subsystem 1108 can include an autonomous vehicle—i.e., a vehicle that does not require a human operator. In these embodiments, the vehicle subsystem 1108 can perform maneuvers, communicate, and otherwise function without the aid of a human provider, in accordance with available technology.

In particular embodiments, the vehicle subsystem 1108 may include one or more sensors incorporated therein or associated thereto. For example, sensor(s) can be mounted on the top of the vehicle subsystem 1108 or else can be located within the interior of the vehicle subsystem 1108. In certain embodiments, the sensor(s) can be located in multiple areas at once—i.e., split up throughout the vehicle subsystem 1108 so that different components of the sensor(s) can be placed in different locations in accordance with optimal operation of the sensor(s). In these embodiments, the sensor(s) can include a LIDAR sensor and an inertial measurement unit (IMU) including one or more accelerometers, one or more gyroscopes, and one or more magnetometers. The sensor suite can additionally or alternatively include a wireless IMU (WIMU), one or more cameras, one or more microphones, or other sensors or data input devices capable of receiving and/or recording information relating to navigating a route to pick up, transport, and/or drop off a requester.

In particular embodiments, the vehicle subsystem 1108 may include a communication device capable of communicating with the client device 1106 and/or the transportation matching system 114. For example, the vehicle subsystem 1108 can include an on-board computing device communicatively linked to the network 1104 to transmit and receive data such as GPS location information, sensor-related information, requester location information, or other relevant information.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A method comprising:
   receiving, by one or more servers of a transportation matching system, geographic location data captured by geographic location sensors of requester computing devices and geographic location sensors of provider computing devices via a communications network;
   determining, by the one or more servers of the transportation matching system and based on the received geographic location data, a predicted device utilization for the requester computing devices across time periods;
   determining, by the one or more servers of the transportation matching system and based on the received geographic location data, a predicted device utilization for the provider computing devices across the time periods;
   generating, by the one or more servers of the transportation matching system and based on the predicted device utilization for the requester computing devices and the predicted device utilization for the provider computing devices, predicted device utilization ratios for the time periods;
   determining, by the one or more servers of the transportation matching system, probabilities for the predicted device utilization ratios;
   providing, by the one or more servers for display to a user interface of a transportation matching application of a provider computing device via the communications network, a graphical representation of the probabilities for the predicted device utilization ratios across the time periods in connection with a scheduling element for setting a goal for providing transportation services for the provider computing device;
   generating, by the one or more servers in response to a selected goal received from the provider computer device via an interaction with the scheduling element, one or more scheduling indicators for one or more subsets of the time periods of the graphical representation in the user interface of the transportation matching application of the provider computing device;
   in connection with providing the graphical representation of the probabilities for the time periods to the provider computing device, generating, by the one or more servers, one or more suggested locations and one or more suggested times for transportation requests based on the predicted device utilization ratios;

generating, by the one or more servers, a transportation match for a transportation request between a requester computing device and the provider computing device according to the one or more suggested locations and the one or more suggested times; and generating, by the one or more servers for display to the user interface of the transportation matching application of the provider computing device via the communications network, an updated graphical representation in response to generating updated predicted device ratios based on the transportation match and geographic location data for the requester computing device and the provider computing device.

2. The method of claim 1, further comprising:

generating a probability distribution of the predicted device utilization ratios based on historical provider computing device utilization and historical requester computing device utilization; and mapping the predicted device utilization ratios for the time periods to bins based on the probability distribution, wherein the bins reflect cumulative probability ranges.

3. The method of claim 1, wherein determining the probabilities further comprises:

determining a lower device utilization threshold; and generating the probabilities by mapping the predicted device utilization ratios above the lower device utilization threshold.

4. The method of claim 1, further comprising:

generating projected provider device ridership metrics for the time periods based at least on a radical of a projected number of rides for the time periods; and causing the provider computing device to display one or more provider graphical representations portraying the projected provider device ridership metrics with respect to the time periods.

5. The method of claim 1, further comprising:

identifying an event corresponding to a time range within the time periods;

determining an event modifier corresponding to the event;

identifying one or more probabilities corresponding to the time range from the probabilities for the predicted device utilization ratios;

adjusting the one or more probabilities corresponding to the time range utilizing the event modifier; and causing the provider computing device to display the graphical representation based on the adjusted one or more probabilities.

6. The method of claim 1, further comprising:

identifying a season corresponding to a time range within the time periods;

determining a seasonal modifier corresponding to the season;

identifying one or more probabilities corresponding to the time range from the probabilities;

adjusting the one or more probabilities corresponding to the time range utilizing the seasonal modifier; and causing the provider computing device to display the graphical representation based on the adjusted one or more probabilities.

7. The method of claim 1, further comprising:

generating, by the one or more servers of the transportation matching system, a suggested schedule for the provider computing device based on the selected goal received from the provider computing device; and highlighting the one or more subsets of the time periods comprising the one or more suggested times for transportation requests in the graphical representation based on the suggested schedule.

8. A non-transitory computer-readable medium storing instructions that, when executed by at least one processor, cause a computer system to:

receive, by one or more servers of a transportation matching system, geographic location data captured by geographic location sensors of requester computing devices and geographic location sensors of provider computing devices via a communications network;

determine, by the one or more servers of the transportation matching system and based on the received geographic location data, a predicted device utilization for the requester computing devices across time periods;

determine, by the one or more servers of the transportation matching system and based on the received geographic location data, a predicted device utilization for the provider computing devices across the time periods;

generate, by the one or more servers of the transportation matching system and based on the predicted device utilization for the requester computing devices and the predicted device utilization for the provider computing devices, predicted device utilization ratios for the time periods;

determine, by the one or more servers of the transportation matching system, probabilities for the predicted device utilization ratios;

provide, by the one or more servers for display to a user interface of a transportation matching application of a provider computing device via the communications network, a graphical representation of the probabilities for the predicted device utilization ratios across the time periods in connection with a scheduling element for setting a goal for providing transportation services for the provider computing device;

generate, by the one or more servers in response to a selected goal received from the provider computer device via an interaction with the scheduling element, one or more scheduling indicators for one or more subsets of the time periods of the graphical representation in the user interface of the transportation matching application of the provider computing device;

in connection with providing the graphical representation of the probabilities for the time periods to the provider computing device, generate one or more suggested locations and one or more suggested times for transportation requests based on the predicted device utilization ratios;

generate a transportation match for a transportation request between a requester device and the provider computing device according to the one or more suggested locations and the one or more suggested times; and generate, for display to the user interface of the transportation matching application of the provider computing device via the communications network, an updated graphical representation in response to generating updated predicted device ratios based on the transportation match.

9. The non-transitory computer-readable medium of claim 8, further comprising instructions that, when executed by at least one processor, cause the computer system to:

identify a probability distribution of the predicted device utilization ratios based on historical provider computing device utilization and historical requester computing device utilization; and map the predicted device utilization ratios for the time periods to bins based on the probability distribution, wherein the bins reflect cumulative probability ranges.

10. The non-transitory computer-readable medium of claim 8, further comprising instructions that, when executed by at least one processor, cause the computer system to determine the probabilities by:

determine a lower device utilization threshold; and
generate the probabilities by mapping the predicted device utilization ratios above the lower device utilization threshold.

11. The non-transitory computer-readable medium of claim 8, further comprising instructions that, when executed by at least one processor, cause the computer system to:

generate projected provider device ridership metrics for the time periods based at least on a radical of a projected number of rides for the time periods; and
cause the provider computing device to display one or more provider graphical representations portraying the projected provider device ridership metrics with respect to the time periods.

12. The non-transitory computer-readable medium of claim 8, further comprising instructions that, when executed by at least one processor, cause the computer system to:

identify an event corresponding to a time range within the time periods;
determine an event modifier corresponding to the event;
identify one or more probabilities corresponding to the time range from the probabilities for the predicted device utilization ratios;
adjust the one or more probabilities corresponding to the time range utilizing the event modifier; and
causing the provider computing device to display the graphical representation based on the adjusted one or more probabilities.

13. The non-transitory computer-readable medium of claim 8, further comprising instructions that, when executed by at least one processor, cause the computer system to:

identify a season corresponding to a time range within the time periods;
determine a seasonal modifier corresponding to the season;
identify one or more probabilities corresponding to the time range from the probabilities;
adjust the one or more probabilities corresponding to the time range utilizing the seasonal modifier; and
cause the provider computing device to display the graphical representation based on the adjusted one or more probabilities.

14. The non-transitory computer-readable medium of claim 8, further comprising instructions that, when executed by the at least one processor, cause the computer system to:

determine, from the provider computing device, the selected goal by receiving an indication of a selection of the scheduling element for setting a goal for providing transportation services for the provider computing device in connection with the graphical representation;
determine, by the one or more servers of the transportation matching system, the one or more subsets of the time periods to meet the goal for providing transportation services for the provider computing device; and
provide, for display in the user interface of the transportation matching application of the provider computing device, the one or more scheduling indicators for the one or more subsets of the time periods by highlighting the one or more subsets of the time periods in the graphical representation.

15. A system comprising:

at least one processor; and
at least one non-transitory computer-readable storage medium storing instructions that, when executed by the at least one processor, cause the system to:

receive, by one or more servers of a transportation matching system, geographic location data captured by geographic location sensors of requester computing devices and geographic location sensors of provider computing devices via a communications network;
determine, by the one or more servers of the transportation matching system and based on the received geographic location data, a predicted device utilization for the requester computing devices across time periods;
determine, by the one or more servers of the transportation matching system and based on the received geographic location data, a predicted device utilization for the provider computing devices across the time periods;
generate, by the one or more servers of the transportation matching system and based on the predicted device utilization for the requester computing devices and the predicted device utilization for the provider computing devices, predicted device utilization ratios for the time periods;
determine, by the one or more servers of the transportation matching system, probabilities for the predicted device utilization ratios;
provide, by the one or more servers for display to a user interface of a transportation matching application of a provider computing device via the communications network, a graphical representation of the probabilities for the predicted device utilization ratios across the time periods in connection with a scheduling element for setting a goal for providing transportation services for the provider computing device;
generate, by the one or more servers in response to a selected goal received from the provider computer device via an interaction with the scheduling element, one or more scheduling indicators for one or more subsets of the time periods of the graphical representation in the user interface of the transportation matching application of the provider computing device;
in connection with providing the graphical representation of the probabilities for the time periods to the provider computing device, generate, by the one or more servers, one or more suggested locations and one or more suggested times for transportation requests based on the predicted device utilization ratios;
generate a transportation match for a transportation request between a requester device and the provider computing device according to the one or more suggested locations and the one or more suggested times; and
generate, by the one or more servers for display to the user interface of the transportation matching application of the provider computing device via the communications network, an updated graphical representation in response to generating updated predicted device ratios based on the transportation match.

16. The system of claim 15, further comprising instructions that, when executed by the at least one processor, cause the system to:
 generate a probability distribution of the predicted device utilization ratios based on historical provider computing device utilization and historical requester computing device utilization; and
 map the predicted device utilization ratios for the time periods to bins based on the probability distribution, wherein the bins reflect cumulative probability ranges.

17. The system of claim 15, further comprising instructions that, when executed by the at least one processor, cause the system to determine the probabilities by:
 determine a lower device utilization threshold; and
 generate the probabilities by mapping the predicted device utilization ratios above the lower device utilization threshold.

18. The system of claim 15, further comprising instructions that, when executed by the at least one processor, cause the system to:
 generate projected provider device ridership metrics for the time periods based at least on a radical of a projected number of rides for the time periods; and
 cause the provider computing device to display one or more provider graphical representations portraying the projected provider device ridership metrics with respect to the time periods.

19. The system of claim 15, further comprising instructions that, when executed by the at least one processor, cause the system to:
 identify an event corresponding to a time range within the time periods;
 determine an event modifier corresponding to the event;
 identify one or more probabilities corresponding to the time range from the probabilities for the predicted device utilization ratios;
 adjust the one or more probabilities corresponding to the time range utilizing the event modifier; and
 causing the provider computing device to display the graphical representation based on the adjusted one or more probabilities.

20. The system of claim 15, further comprising instructions that, when executed by the at least one processor, cause the system to:
 determine preferences or historical transportation times associated with a particular provider computing device of the provider computing devices;
 generate a suggested transportation schedule for the particular provider computing device comprising the one or more subsets of the time periods based on the preferences or the historical transportation times associated with the particular provider computing device; and
 provide the suggested transportation schedule to the particular provider computing device by highlighting the one or more subsets of the time periods within the graphical representation of the probabilities for the time periods.

* * * * *